(12) United States Patent
Adachi

(10) Patent No.: US 11,268,866 B2
(45) Date of Patent: Mar. 8, 2022

(54) CHARGE AMPLIFIER, FORCE SENSOR, AND ROBOT

(71) Applicant: Seiko Epson Corporation, Tokyo (JP)

(72) Inventor: Kazuhiro Adachi, Chino (JP)

(73) Assignee: Seiko Epson Corporation

( * ) Notice: Subject to any disclaimer, the term of this patent is extended or adjusted under 35 U.S.C. 154(b) by 67 days.

(21) Appl. No.: 16/912,975

(22) Filed: Jun. 26, 2020

(65) Prior Publication Data

US 2020/0408618 A1    Dec. 31, 2020

(30) Foreign Application Priority Data

Jun. 28, 2019    (JP) .............................. JP2019-121003

(51) Int. Cl.
*G01L 1/16*    (2006.01)
*G01L 5/167*    (2020.01)
*G01L 5/00*    (2006.01)

(52) U.S. Cl.
CPC .............. *G01L 1/16* (2013.01); *G01L 5/0028* (2013.01); *G01L 5/167* (2013.01)

(58) Field of Classification Search
CPC ......... G01L 1/16; G01L 5/0028; G01L 5/167; H01Q 1/243
USPC .................................................. 73/862.381
See application file for complete search history.

(56) References Cited

U.S. PATENT DOCUMENTS

| 4,918,500 A * | 4/1990 | Inuishi .............. H01L 27/10829 257/303 |
| 9,543,946 B2 * | 1/2017 | Kim ........................ H03K 17/96 |
| 2016/0191825 A1 * | 6/2016 | Sato .................. H01L 27/14665 348/250 |
| 2017/0310344 A1 * | 10/2017 | Lee .......................... H04B 1/40 |
| 2018/0149530 A1 | 5/2018 | Yamamura |

FOREIGN PATENT DOCUMENTS

| JP | H11-148878 A | 6/1999 |
| JP | 2009-058290 A | 3/2009 |
| JP | 2010-154394 A | 7/2010 |
| JP | 2018-087781 A | 6/2018 |

* cited by examiner

*Primary Examiner* — Octavia Hollington
(74) *Attorney, Agent, or Firm* — Harness, Dickey & Pierce, P.L.C.

(57) ABSTRACT

A charge amplifier that converts a charge signal to a voltage signal includes: a first conductive member through which the charge signal propagates; a second conductive member that is provided along at least a portion of the first conductive member; an insulating member provided between the first conductive member and the second conductive member; a potential controlling voltage signal output circuit that is connected to the second conductive member, and is configured to supply a potential controlling voltage signal to the second conductive member; and an integrating circuit that includes an input terminal and an output terminal, the input terminal being connected to the first conductive member, and is configured to output the voltage signal from the output terminal.

14 Claims, 9 Drawing Sheets

CHARGE AMPLIFIER, FORCE SENSOR, AND ROBOT

The present application is based on, and claims priority from JP Application Serial Number 2019-121003, filed Jun. 28, 2019, the disclosure of which is hereby incorporated by reference herein in its entirety.

BACKGROUND

1. Technical Field

The present invention relates to a charge amplifier, a force sensor, and a robot.

2. Related Art

A charge amplifier is known that includes an integrating circuit using an operational amplifier and a capacitor, and converts a charge signal to a voltage signal. There are cases where a so-called drift occurs such that the output of the integrating circuit changes over time in such a charge amplifier. When such a drift occurs, there is a risk of the output of the integrating circuit entering a saturated state after a certain amount of time has passed, and even if a charge signal is input to the integrating circuit, the charge signal is not reflected on the output of the integrating circuit, and as a result, the integrating circuit no longer functions properly.

Regarding such a drift, JP-A-11-148878 discloses a technique in which the influence of occurrence of a drift is reduced by canceling a leak current generated in the integrating circuit by supplying a compensating current to the integrating circuit in a direction for canceling the leak current via a diode. Also, JP-A-2009-058290 discloses a technique in which the influence of the occurrence of a drift is reduced by supplying a compensating current to the integrating circuit via a capacitor.

However, in the techniques described in JP-A-11-148878 and JP-A-2009-058290, the compensating current for reducing the influence of a drift is supplied through a diode or a capacitor, and therefore the magnitude of the compensating current changes due to the influence of the variation in manufacturing the diode or the capacitor, or a change in the characteristics thereof due to a change in temperature or elapsing of time. Therefore, there is a room for improvement in terms of reducing the influence of the occurrence of drift.

SUMMARY

A charge amplifier according to one aspect of the disclosure converts a charge signal to a voltage signal. The charge amplifier includes: a first conductive member through which the charge signal propagates; a second conductive member that is provided along at least a portion of the first conductive member; an insulating member provided between the first conductive member and the second conductive member; a potential controlling voltage signal output circuit that is connected to the second conductive member, and is configured to supply a potential controlling voltage signal to the second conductive member; and an integrating circuit that includes an input terminal and an output terminal, the input terminal being connected to the first conductive member, and is configured to output the voltage signal from the output terminal.

In the charge amplifier according to the one aspect, the second conductive member may include a metal interconnect.

In the charge amplifier according to the one aspect, the second conductive member may include an impurity region.

In the charge amplifier according to the one aspect, the insulating member may include a silicon oxide.

In the charge amplifier according to the one aspect, the potential of the potential controlling voltage signal may be controlled to be a potential different from a potential of the first conductive member.

In the charge amplifier according to the one aspect, the potential of the potential controlling voltage signal may be controlled to be a potential between a potential of a power supply voltage of the integrating circuit and a ground potential.

The charge amplifier according to the one aspect further includes a temperature detection circuit configured to detect temperature. The potential of the potential controlling voltage signal may be controlled based on temperature detected by the temperature detection circuit.

In the charge amplifier according to the one aspect, the first conductive member, the second conductive member, and the insulating member may be stacked in the order of the second conductive member, the insulating member, and the first conductive member.

In the charge amplifier according to the one aspect, the potential of the potential controlling voltage signal may be switched between a potential of a power supply voltage of the integrating circuit and a ground potential.

The charge amplifier according to the one aspect further includes a third conductive member that is provided along at least a portion of the first conductive member. The insulating member may be provided between the first conductive member and the third conductive member, the third conductive member may be connected to the potential controlling voltage signal output circuit, and the potential controlling voltage signal output circuit may supply, as the potential controlling voltage signal, a first potential controlling voltage signal to the second conductive member, and a second potential controlling voltage signal to the third conductive member.

The charge amplifier according to the one aspect further includes a shield interconnect that is provided along at least a portion of the first conductive member. A reference potential to be input to the integrating circuit may be supplied to the shield interconnect, and the insulating member may be provided between the shield interconnect and the first conductive member.

A force sensor according to one aspect of the invention includes: the charge amplifier according to the one aspect; and a detection element configured to detect an external force and output the charge signal.

A robot according to one aspect of the invention includes the charge amplifier according to the one aspect.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Hereinafter, preferable embodiments of the invention will be described using the drawings. The drawings to be used are merely for description. Note that the embodiments given below are not intended to unduly limit the scope of the invention recited in the appended claims. In addition, not all of the constituent elements described below are essential to the invention. Note that, in the embodiments, a description will be given taking a force sensor including a charge amplifier (Q-V conversion circuit) that converts a charge signal to a voltage signal, and a robot including the force sensor as an example.

1. Force Sensor

1.1 First Embodiment

Configuration of Force Sensor

Figure 1:
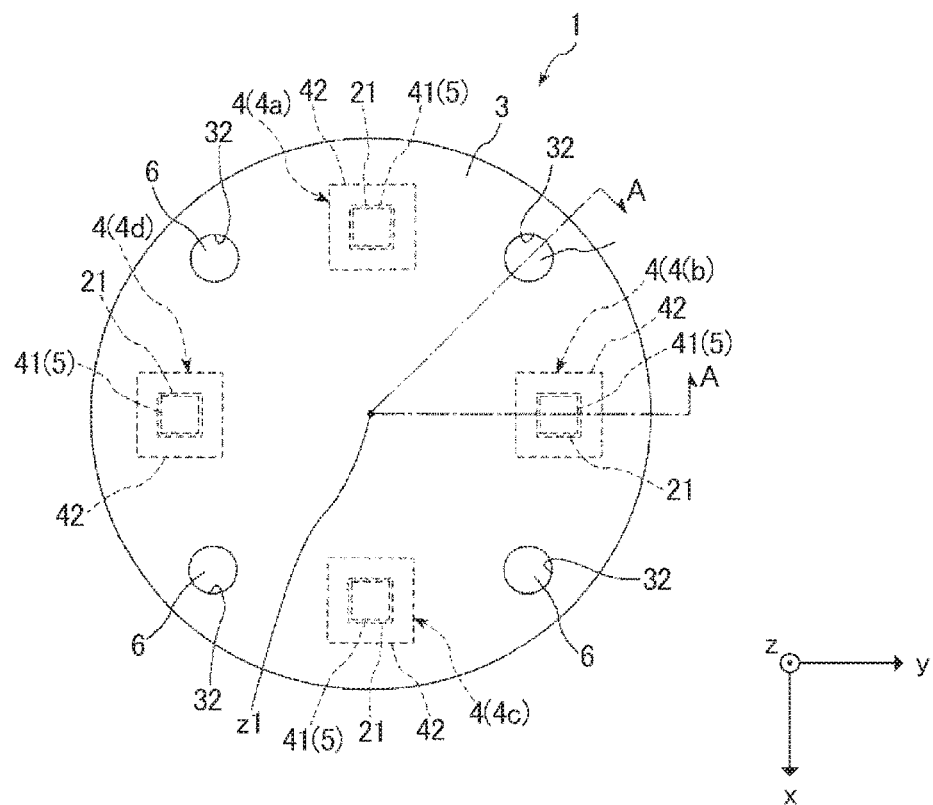
FIG. 1 is a plan view illustrating a configuration of a force sensor of a first embodiment.
Figure 2:
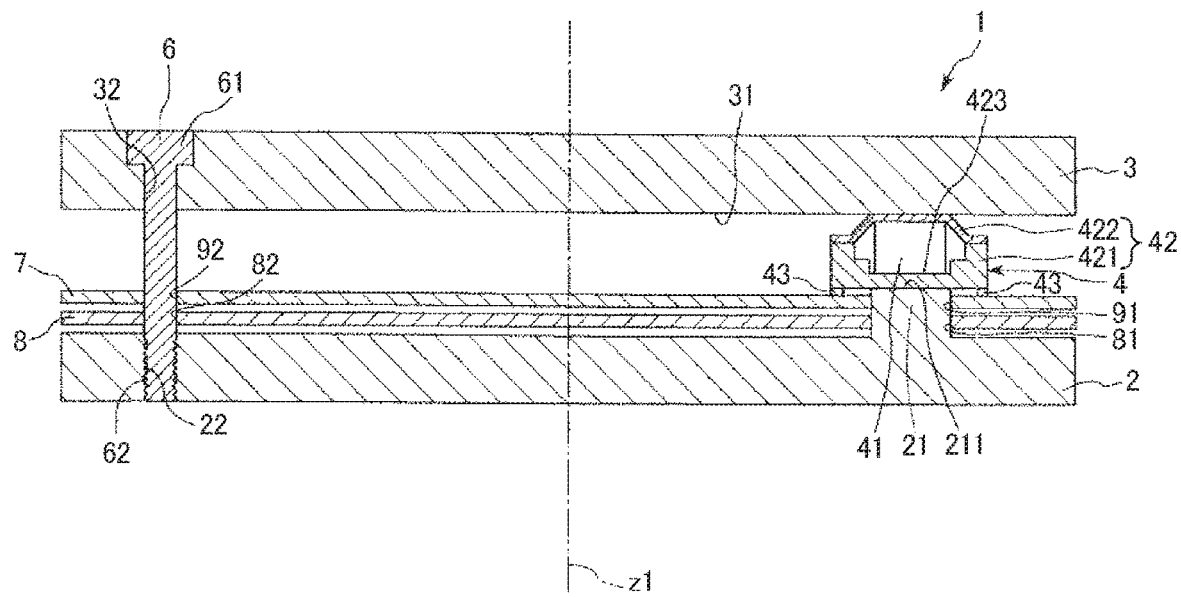
FIG. 2 is a cross-sectional view of the force sensor shown in FIG. 1 taken along line A-A.
Figure 3:
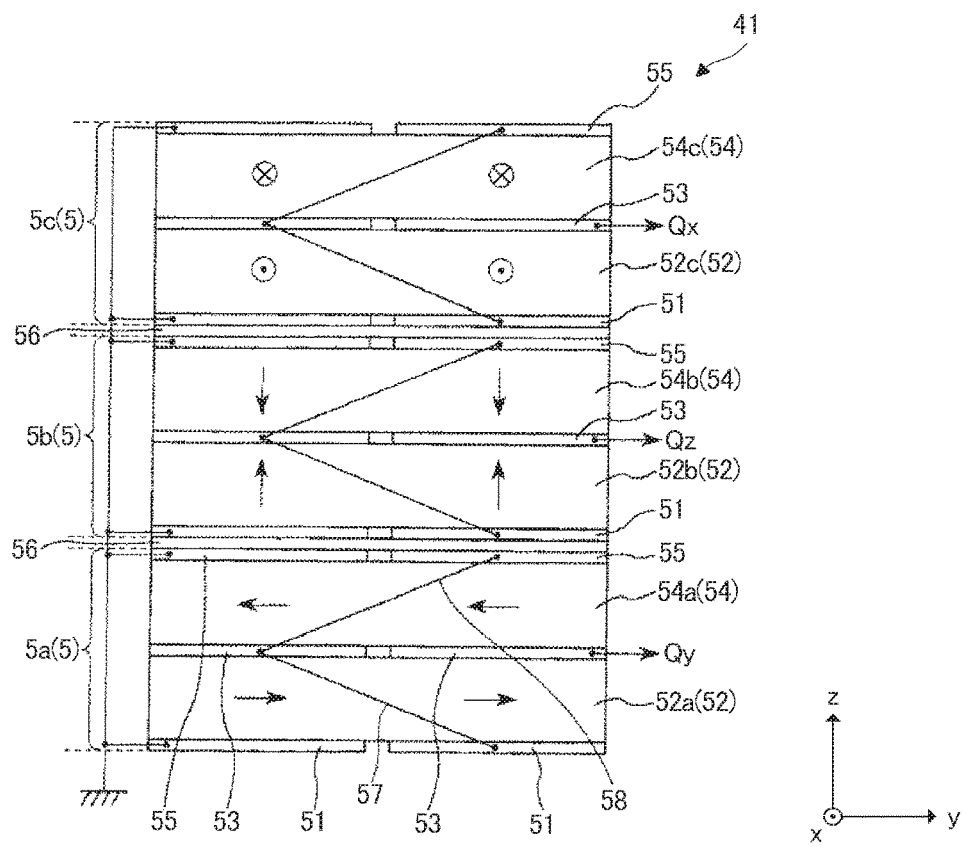
FIG. 3 is a cross-sectional view of a force detection module included in the force sensor shown in FIGS. 1 and 2.
Figure 4:
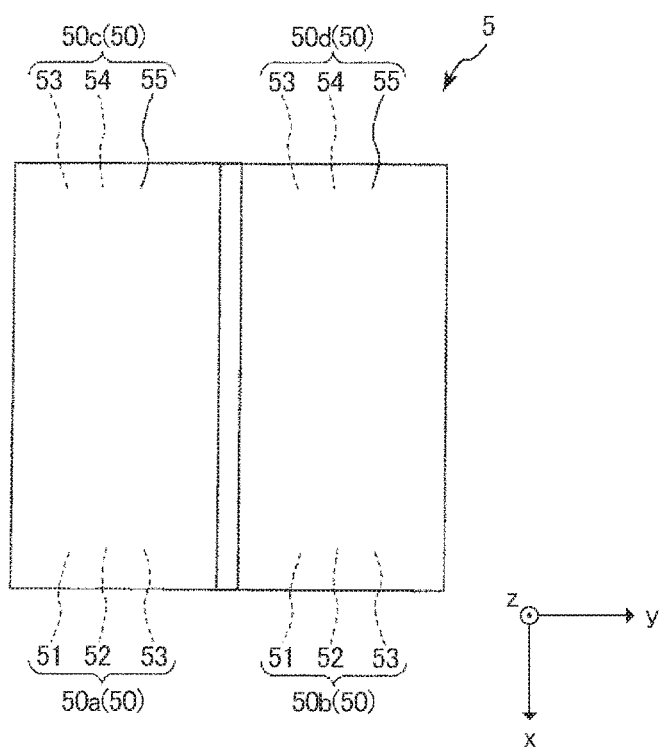
FIG. 4 is a plan view of a force detection element included in the force sensor shown in FIGS. 1 and 2.

First, the configuration of a force sensor 1 in a first embodiment will be described using FIGS. 1 to 4. FIG. 1 is a plan view illustrating a configuration of the force sensor 1 of the first embodiment. FIG. 2 is a cross-sectional view of the force sensor shown in FIG. 1 taken along line A-A. FIG. 3 is a cross-sectional view of a force detection module 41 included in the force sensor 1 shown in FIGS. 1 and 2. FIG. 4 is a plan view of a force detection element 5 included in the force sensor 1 shown in FIGS. 1 and 2. Note that in each of FIGS. 1 to 4, the x, y, and z axes are illustrated as three axes that are orthogonal to each other. Also, in the following description, a tip end side of an arrow of each axis may be denoted by "+", and a base end side may be denoted by "−". Also, the direction parallel to the x axis may be referred to as an "x-axis direction", the direction parallel to the y axis may be referred to as a "y-axis direction", and the direction parallel to the z axis may be referred to as a "z-axis direction". Moreover, +z-axis direction side may be referred to as "upper", −z-axis direction side may be referred to as "lower", and viewing in the z-axis direction may be referred to as "plan view".

The force sensor 1 shown in FIG. 1 is a six-axis force sensor that outputs a signal of six-axis components corresponding to an applied external force. Here, the six-axis components include translational components in three axis directions of the x, y, and z axes, and rotational components around three axes of the x, y, and z axes.

As shown in FIG. 2, the force sensor 1 includes a first base 2, a second base 3 that is arranged with a gap from the first base 2, a sensor device 4, an analog circuit substrate 7, and a digital circuit substrate 8 that are provided between the first base 2 and the second base 3, and a pressure applying bolt 6 that fixes the first base 2 and the second base 3 to each other. Note that, in the following description, it is assumed that the force sensor 1 includes four sensor devices 4 and four pressure applying bolts 6, but the number of sensor devices 4 and pressure applying bolts is not limited to four.

In such a force sensor 1, the applied external force is detected by the sensor devices 4, and the signals corresponding to the detected external force are processed by the analog circuit substrate 7 and the digital circuit substrate 8, and as a result, the force sensor 1 outputs a signal having six axis components corresponding to the external force applied to the force sensor 1.

The first base 2 is a substantially plate-shaped member having a circular external shape in a plan view thereof. Note that the external shape of the first base 2 is not limited to a circle, and may also be a polygon such as a quadrangle or a pentagon, an ellipse, or the like. As shown in FIGS. 1 and 2, a plurality of protrusions 21 are provided on a face of the first base 2 on a second base 3 side at positions separated from an axis line z1. The plurality of protrusions 21 are arranged on the same circumference centered on the axis line z1 at equal intervals. Also, a top face 211, which is an end face of each protrusion 21 is a flat face having a quadrangular external shape in a plan view thereof. Note that the shape of the top face 211 is not limited to a quadrangle, and may also be a polygon such as a pentagon or a hexagon, a circle, or an ellipse, for example. Also, a plurality of female threads 22 are provided in the first base 2 that are screwed together with respective pressure applying bolts 6 at positions separated from the axis line z1. These plurality of female threads 22 are arranged on the same circumference centered on the axis line z1 at equal intervals.

A metal material such as a stainless steel or a ceramic material is used as a constituent material of the first base 2, for example. Note that, in FIG. 2, each protrusion 21 is formed integrally with the first base 2, but the protrusion 21 may also be formed by a member separate from the first base 2. In this case, the protrusion 21 and the first base 2 may be formed from the same material, or formed from different materials.

The second base 3 is a substantially plate-shaped member having a circular external shape in a plan view. Note that the external shape of the second base 3 is not limited to a circle, and may also be a polygon such as a quadrangle or a pentagon, an ellipse, or the like. A plurality of through holes 32 through which the respective pressure applying bolts 6 pass are provided in the second base 3 at positions that correspond to the plurality of female threads 22 of the first base 2 and are separated from the axis line z1. A level difference portion that engages with a head 61 of the pressure applying bolt 6 is formed at an upper portion of each through hole 32.

A metal material such as a stainless steel or a ceramic material is used as a constituent material of the second base 3, similarly to the first base 2 described above, for example. Note that, in this case, the second base 3 may be formed from the same material as the first base 2, or formed from a different material.

As shown in FIG. 2, the four sensor devices 4 each include a force detection module 41 and a package 42 that houses the force detection module 41.

The package 42 includes a base 421 having a recess whose bottom face is an installation face 423 on which the force detection module 41 is installed, and a lid 422 joined to the base 421, and the recess of the base 421 is sealed by the lid 422. With this, the package 42 protects the force detection module 41.

The base 421 is provided on the top face 211 of the protrusion 21 of the first base 2 described above. Also, a plurality of terminals 43 that are electrically connected to the analog circuit substrate 7 are provided on the lower face of the base 421. The plurality of terminals 43 are electrically connected to the force detection module 41 via through-electrodes, which are not illustrated, that pass through the base 421. An insulating material such as a ceramic material is used as a constituent material of the base 421 described above, for example.

Also, the lid 422 is a substantially plate-shaped member in which a face of the lid 422 on a base 421 side is in contact with the force detection module 41, and a face thereof on the side opposite to the base 421 is in contact with the second base 3. Various metal materials such as a stainless steel are used as a constituent material of such a lid 422, for example. Note that the base 421 and the lid 422 may be formed from the same material, or formed from different materials. Note that, as shown in FIG. 1, the shapes, in a plan view thereof, of the force detection module 41 and the package 42 are illustrated as quadrangles, but the shapes, in a plan view thereof, of the force detection module 41 and the package 42 may also be another polygon such as a pentagon or hexagon, a circle, or an ellipse, for example.

The force detection module 41 outputs a charge Qx as a component in the x-axis direction, a charge Qy as a component in the y-axis direction, and a charge Qz as a component in the x-axis direction that correspond to an external force applied to the force detection module 41. Specifically, as shown in FIG. 3, the force detection module 41 includes a force detection element 5a that outputs the charge Qy corresponding to an external force parallel to the y axis, a force detection element 5b that outputs the charge Qz corresponding to an external force parallel to the z axis, and a force detection element 5c that outputs the charge Qx corresponding to an external force parallel to the x axis. Such force detection element 5a, force detection element 5b, and force detection element 5c are stacked in the force detection module 41 in the order of the force detection element 5a, the force detection element 5b, and the force detection element 5c.

Also, in the force detection module 41, an insulating adhesive 56 is interposed between the force detection element 5a and the force detection element 5b and between the force detection element 5b and the force detection element 5c. The force detection elements 5a, 5b, and 5c are joined with these adhesives 56. Note that, in the following description, if it is not necessary to make a distinction between the force detection elements 5a, 5b, and 5c, they may be simply referred to as "force detection elements 5".

Each force detection element 5 includes two electrodes 51, a piezoelectric substance 52, two electrodes 53, a piezoelectric substance 54, and two electrodes 55. Also, in the force detection element 5, the two electrodes 51, the piezoelectric substance 52, the two electrodes 53, the piezoelectric substance 54, and the two electrodes 55 are stacked in the order of the two electrodes 51, the piezoelectric substance 52, the two electrodes 53, the piezoelectric substance 54, and the two electrodes 55.

The piezoelectric substances 52 and 54 each have a plate-like shape or a sheet-like shape, and is made of quartz, for example. Here, the piezoelectric substances 52 and 54 are provided such that the directions of X axes (electrical axes), which are each a crystal axis of quartz, of the pieces of quartz that constitute the piezoelectric substances 52 and 54 are different to each other between the force detection elements 5a, 5b, and 5c. Note that, in FIG. 3, the direction of X axis is indicated by an arrow in each of the force detection elements 5a, 5b, and 5c.

Specifically, as shown in FIG. 3, the X axis of the piezoelectric substance 52a, which is a piezoelectric substance 52 included in the force detection element 5a, extends in the y-axis direction from −y side toward +y side, and the X axis of the piezoelectric substance 54a, which is a piezoelectric substance 54 included in the force detection element 5a, extends in the y-axis direction from +y side toward −y side. Also, the X axis of the piezoelectric substance 52b, which is a piezoelectric substance 52 included in the force detection element 5b, extends in the z-axis direction from −z side toward +z side, and the X axis of the piezoelectric substance 54b, which is a piezoelectric substance 54 included in the force detection element 5b, extends in the z-axis direction from +z side toward −z side. Also, the X axis of the piezoelectric substance 52c, which is a piezoelectric substance 52 included in the force detection element 5c, extends in the x-axis direction from −x side toward +x side, and the X axis of the piezoelectric substance 54c, which is a piezoelectric substance 54 included in the force detection element 5c, extends in the x-axis direction from +x side toward −x side.

The piezoelectric substances 52a, 54a, 52c, and 54c described above are each constituted by a Y-cut quartz plate, and the piezoelectric substances 52a, 54a, 52c, and 54c are arranges such that the X-axis directions of the piezoelectric substances 52a, 52c, 54a, and 54c differ by 90 degrees in the order of the piezoelectric substances 52a, 52c, 54a, and 54c. Also, the piezoelectric substances 52b and 54b are each constituted by an X-cut quartz plate, and are arranged such that the X-axis directions thereof differ by 180 degrees to each other.

The two electrodes 51, 53, and 55 are each provided side by side in the y-axis direction. Also, one each of the electrodes 51, 53, and 55 on one side in the y-axis direction are arranged so as to overlap each other in the z-axis direction, and one each of the electrodes 51, 53, and 55 on the other side in the y-axis direction are arranged so as to overlap each other in the z-axis direction. Note that the following description will be given assuming that the one side, in the y-axis direction, on which one each of the electrodes 51, 53, and 55 are arranged corresponds to a left side in FIG. 4, and the other side corresponds to a right side.

Also, as shown in FIG. 4, a piezoelectric element 50a is constituted by one each of the electrodes 51 and 53 on the one side in the y-axis direction, and the piezoelectric substance 52 interposed between the one each of the electrodes 51 and 53, and a piezoelectric element 50b is constituted by one each of the electrodes 51 and 53 on the other side in the y-axis direction, and the piezoelectric substance 52 interposed between the one each of the electrodes 51 and 53. Similarly, a piezoelectric element 50c is constituted by one each of the electrodes 53 and 55 on the one side in the y-axis direction, and the piezoelectric substance 54 interposed between the one each of the electrodes 53 and 55, and a piezoelectric element 50d is constituted by one each of the electrodes 53 and 55 on the other side in the y-axis direction, and the piezoelectric substance 54 interposed between the one each of the electrodes 53 and 55. Note that, in the following description, if it is not necessary to make a distinction between the piezoelectric elements 50a, 50b, 50c, and 50d, they may be simply referred to as "piezoelectric elements 50".

As described above, each force detection element 5 includes the piezoelectric elements 50a, 50b, 50c, and 50d, and the piezoelectric elements 50a and 50b are arranged side by side in the y-axis direction on the same plane, and the piezoelectric elements 50c and 50d are arranged side by side in the y-axis direction on the same plane. In other words, the piezoelectric elements 50a and 50b are arranged so as not to overlap each other in a plan view thereof, and the piezoelectric elements 50c and 50d are arranged so as not to overlap each other in a plan view thereof.

Also, an electrode 51, of two electrodes 51, on the other side in the y-axis direction is electrically connected to an electrode 53, of two electrodes 53, on the one side in the y-axis direction via a wiring 57. With this, each piezoelectric element 50a is electrically connected in series to the piezoelectric element 50b. Similarly, an electrode 53, of two electrodes 53, on the one side in the y-axis direction is electrically connected to an electrode 55, of two electrodes 55, on the other side in the y-axis direction via a wiring 58. With this, each piezoelectric element 50c is electrically connected in series to the piezoelectric element 50d.

In this way, piezoelectric elements 50a and 50b that are arranged so as not to overlap each other in a plan view thereof are electrically connected in series, and piezoelectric elements 50c and 50d that are arranged so as not to overlap each other in a plan view thereof are electrically connected in series, and as a result, the S/N ratio can be improved without incurring an increase in the size of the force detection element 5, a reduction of the withstanding load, and a reduction in responsiveness.

Here, the materials of the electrodes 51, 53, and 55 need only be materials that can function as an electrode, and may be nickel, gold, titanium, aluminum, copper, iron, chromium, or alloy thereof. One of the stated materials or a combination of two or more materials is used.

As described above, the configuration of the force detection module 41 has been described, but the number of force detection elements 5 included in the force detection module 41 and the number of piezoelectric elements 50 constituting the force detection element 5 are not limited to the numbers stated above. Here, the force detection element 5 or the piezoelectric element 50 included in the force detection element 5 is an example of a detection element.

As shown in FIG. 2, the plurality of pressure applying bolts 6 fix the first base 2 and the second base 3 to each other in a state of sandwiching the force detection elements 5 included in each sensor device 4 and applying pressure thereon. As shown in FIG. 2, a head 61 is provided in one end portion of each pressure applying bolt 6, and a male thread 62 is provided on the other end portion. The pressure applying bolt 6 passes through the through hole 32 of the second base 3, the head 61 thereof is engaged with the level difference portion of the through hole 32, and the male thread 62 thereof is screwed to the female thread 22. As a result of the first base 2 and the second base 3 being fixed together with such pressure applying bolts 6, a pressure is applied to each force detection module 41 between the top face 211 of the protrusion 21 and the lower face 31. Also, by appropriately adjusting the fastening force of each pressure applying bolt 6, a pressure, in the z-axis direction, having a predetermined magnitude can be applied to each force detection module 41 as an applied pressure. Various metal materials are used as a constituent material of each pressure applying bolt 6, for example. Note that the positions at which the pressure applying bolts 6 are provided are not limited to the positions shown in FIG. 1.

The analog circuit substrate 7 is located between the first base 2 and the second base 3. Through holes 91 through which the respective protrusions 21 pass and through holes 92 through which the respective pressure applying bolts 6 pass are formed in the analog circuit substrate 7. Such an analog circuit substrate 7 is fixed to the sensor devices 4 via the terminals 43 and supported by the force sensor 1. As a result of arranging the analog circuit substrate 7 as described above, the lengths of interconnects that electrically connect between the sensor devices 4 and the analog circuit substrate 7 can be reduced.

Also, the analog circuit substrate 7 is electrically connected to the plurality of terminals 43 included in each sensor device 4. Also, each force detection module 41 outputs the charges Qx, Qy, and Qz to the analog circuit substrate 7 via the plurality of terminals 43. The charges Qx, Qy, and Qz input to the analog circuit substrate 7 are converted to voltages Vx, Vy, and Vz by Q-V conversion circuits 70, shown in FIG. 5, that are provided in the analog circuit substrate 7, and the voltages Vx, Vy, and Vz are output. The details of the Q-V conversion circuits 70 that respectively convert the charges Qx, Qy, and Qz to the voltages Vx, Vy, and Vz, and output the voltages Vx, Vy, and Vz will be described later.

The digital circuit substrate 8 is arranged between the first base 2 and the analog circuit substrate 7, in a region between the above-described first base 2 and second base 3. With this, the lengths of interconnects that electrically connect between the analog circuit substrate 7 and the digital circuit substrate 8 can be reduced. Through holes 81 through which the respective protrusions 21 pass and through holes 82 through which the respective pressure applying bolts 6 pass are formed in the digital circuit substrate 8, similarly to the analog circuit substrate 7. Such a digital circuit substrate 8 is fixed to and supported by the force sensor 1 by being fitted or joined to the first base 2 or the protrusions 21.

Also, the digital circuit substrate 8 includes an external force detection circuit, which is not illustrated, that calculates the external force based on the voltages Vx, Vy, and Vz output from the analog circuit substrate 7. This external force detection circuit is constituted by an AD converter and a computation circuit such as a CPU that is connected to this AD converter, for example. Also, the digital circuit substrate 8 outputs a signal having six axis components including translational components in the three axis directions, the three axes being the x axis, y axis, and z axis, and rotational components around three axes of the x axis, y axis, and z axis, based on the voltages Vx, Vy, and Vz input from the analog circuit substrate 7. Moreover, the digital circuit substrate 8 outputs a reset signal RST for resetting the Q-V conversion circuits 70 to the analog circuit substrate 7.

The constituent material of the analog circuit substrate 7 and digital circuit substrate 8 includes silicon, for example.

Outline of Operations of Force Sensor

The force sensor 1 configured as described above outputs a signal having six axis components including translational components in the three axis directions, the three axes being the x axis, y axis, and z axis, and rotational components around three axes of the x axis, y axis, and z axis, based on the charges Qx, Qy, and Qz output from the sensor devices 4, the signal processing being performed in the analog circuit substrate 7 and the digital circuit substrate 8.

Specifically, when an external force is applied to the force sensor 1, the piezoelectric elements 50*a*, 50*b*, 50*c*, and 50*d* displace, which are included in each of the force detection elements 5*a*, 5*b*, and 5*c* that are included in each of the force detection modules 41 respectively corresponding to the four sensor devices 4 shown in FIG. 1. With this, the force detection elements 5*a*, 5*b*, and 5*c* respectively outputs charges Qx, Qy, and Qz corresponding to displacements of the piezoelectric elements 50*a*, 50*b*, 50*c*, and 50*d*.

The analog circuit substrate 7 includes Q-V conversion circuits 70 respectively corresponding to the charges Qx, Qy, and Qz output from each of the four sensor devices 4. Specifically, the analog circuit substrate 7 is provided with three Q-V conversion circuits 70 respectively corresponding to the charges Qx, Qy, and Qz output from the sensor device 4*a*, shown in FIG. 1, three Q-V conversion circuits 70 respectively corresponding to the charges Qx, Qy, and Qz output from the sensor device 4*b*, three Q-V conversion circuits 70 respectively corresponding to the charges Qx, Qy, and Qz output from the sensor device 4*c*, and three Q-V conversion circuits 70 respectively corresponding to the charges Qx, Qy, and Qz output from the sensor device 4*d*.

Also, the three Q-V conversion circuits 70 respectively corresponding to the charges Qx, Qy, and Qz output from the sensor device 4*a* generates voltages Vxa, Vya, and Vza and outputs the voltages Vxa, Vya, and Vza to the digital circuit substrate 8. Similarly, the three Q-V conversion circuits 70 respectively corresponding to the charges Qx, Qy, and Qz output from the sensor device 4*b* generates voltages Vxb, Vyb, and Vzb and outputs the voltages Vxb, Vyb, and Vzb to the digital circuit substrate 8, the three Q-V conversion circuits 70 respectively corresponding to the charges Qx, Qy, and Qz output from the sensor device 4*c* generates voltages Vxc, Vyc, and Vzc and outputs the voltages Vxc, Vyc, and Vzc to the digital circuit substrate 8, and the three Q-V conversion circuits 70 respectively corresponding to the charges Qx, Qy, and Qz output from the sensor device 4*d* generates voltages Vxd, Vyd, and Vzd and outputs the voltages Vxd, Vyd, and Vzd to the digital circuit substrate 8. That is, the analog circuit substrate 7 in the present embodiment is provided with twelve Q-V conversion circuits 70 in total, and the twelve Q-V conversion circuits 70 outputs the voltages Vxa, Vya, and Vza, the voltages Vxb, Vyb, and Vzb, the voltages Vxc, Vyc, and Vzc, and the voltages Vxd, Vyd, and Vzd to the digital circuit substrate 8 based on the charges Qx, Qy, and Qz input from the corresponding sensor devices 4.

The computation circuit such as a CPU provided in the digital circuit substrate 8 calculates a translational component Fx in the x-axis direction, a translational component Fy in the y-axis direction, a translational component Fz in the z-axis direction, a rotational component Mx around the x axis, a rotational component My around the y axis, and a rotational component Mz around the z axis based on the voltages Vxa, Vya, and Vza, the voltages Vxb, Vyb, and Vzb, voltages Vxc, Vyc, and Vzc, and the voltages Vxd, Vyd, and Vzd that are input from the analog circuit substrate 7 using the following Formulas (1) to (6).

Formula (1)

$$Fx = R1 \times (Vxa + Vxb + Vxc + Vxd)/4 \qquad (1)$$

Formula (2)

$$Fy = R1 \times (Vya + Vyb + Vyc + Vyd)/4 \qquad (2)$$

Formula (3)

$$Fz = R2 \times (Vza + Vzb + Vzc + Vzd)/4 \qquad (3)$$

Formula (4)

$$Mx = R2 \times (Vzd - Vzb)/2 \qquad (4)$$

Formula (5)

$$My = R2 \times (Vzc - Vza)/2 \qquad (5)$$

Formula (6)

$$Mz = R1 \times (Vxb - Vxd + Vya - Vyc)/4 \qquad (6)$$

As described above, the force sensor 1 detects an applied external force using the sensor devices 4, and outputs a signal having six axis components of translational components Fx, Fy, and Fz and rotational components Mx, My, and Mz by processing signals in accordance with the external force detected by the sensor devices 4 using the analog circuit substrate 7 and the digital circuit substrate 8. Note that the digital circuit substrate 8 may perform correction for canceling the differences in sensitivity between the conversion circuits, for example, in addition to the computations described above. Here, R1 and R2 in Formulas (1) to (6) are unit conversion constants for converting voltage to force.

Q-V Conversion Circuit Configuration

Here, the configuration of each Q-V conversion circuit 70 provided in the analog circuit substrate 7 will be described using FIG. 5. Note that the Q-V conversion circuits 70 provided in the analog circuit substrate 7 have the same configuration. Therefore, in the following description, the charges Qx, Qy, and Qz that are output from the sensor device 4 and are input to the Q-V conversion circuits 70 are each a denoted by charge signal Qin, and the voltages Vx, Vy, and Vz output from the Q-V conversion circuits 70 based on the charge signals Qin are each denoted by a voltage signal Vout.

Figure 5:
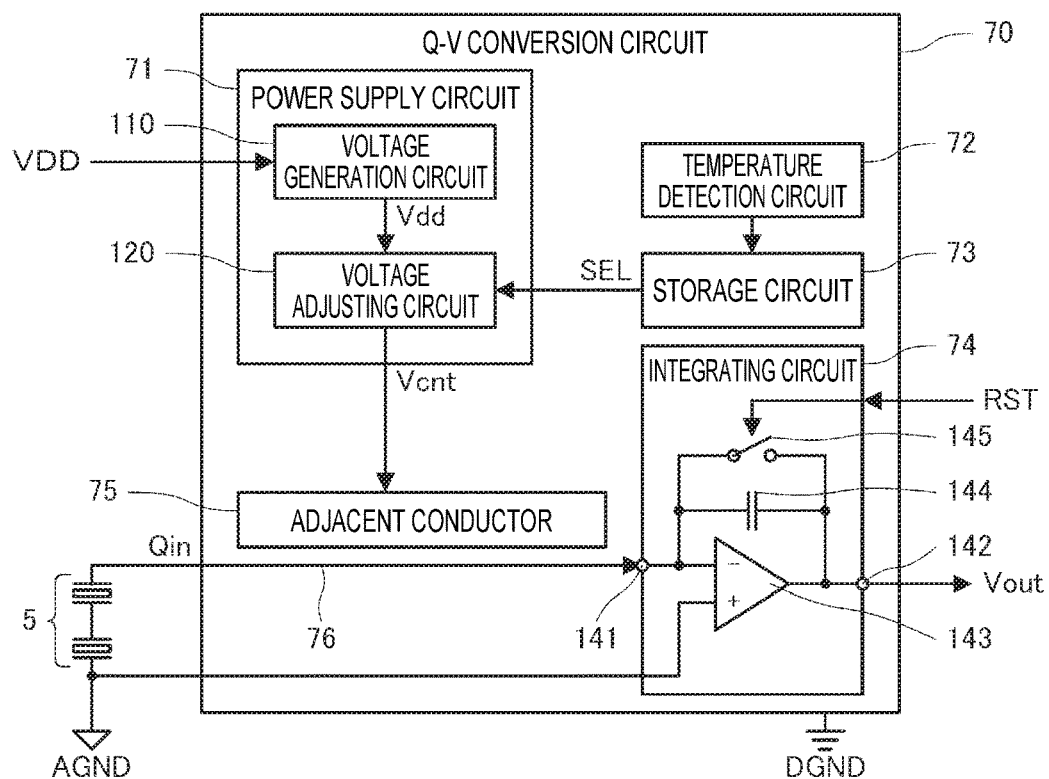
FIG. 5 is a block diagram illustrating a configuration of a Q-V conversion circuit.

FIG. 5 is a block diagram illustrating a configuration of the Q-V conversion circuit 70. As shown in FIG. 5, the Q-V conversion circuit 70 includes a power supply circuit 71, a temperature detection circuit 72, a storage circuit 73, an integrating circuit 74, and an adjacent conductor 75. The Q-V conversion circuit 70 converts the charge signal Qin to the voltage signal Vout. This Q-V conversion circuit 70 is an example of a charge amplifier.

The temperature detection circuit 72 detects temperature of at least one of the analog circuit substrate 7, the Q-V conversion circuit 70, and the force sensor 1 including the Q-V conversion circuit 70, and outputs temperature information including the detected temperature. That is, the Q-V conversion circuit 70 includes the temperature detection circuit 72 that detects temperature. The temperature information output from the temperature detection circuit 72 is input to the storage circuit 73.

Voltage information for specifying the potential of a voltage Vcnt associated with the temperature information to be input is stored in the storage circuit 73. Also, the storage circuit 73 outputs a voltage control signal SEL for controlling the power supply circuit 71 such that the potential of the voltage Vcnt output from the later-described power supply circuit 71 is the potential specified by the stored voltage information. That is, the potential of the voltage Vcnt output from the power supply circuit 71 is controlled based on the temperature detected by the temperature detection circuit 72. Here, values measured at a manufacturing process and a testing process of the Q-V conversion circuit 70 are stored in the storage circuit 73 as the voltage information of the voltage Vcnt associated with the temperature information, for example. That is, voltage information of the voltages Vcnt associated with individual pieces of temperature information in accordance with the characteristics of the individual Q-V conversion circuits 70 are stored in the storage circuit 73.

The power supply circuit 71 includes a voltage generation circuit 110 and a voltage adjusting circuit 120. A voltage VDD is supplied to the voltage generation circuit 110. Also, the voltage generation circuit 110 generates a voltage Vdd at a predetermined potential by stepping up or down the voltage VDD, and outputs the voltage Vdd to the voltage adjusting circuit 120. Here, the voltage Vdd is also used as a power supply voltage of an operational amplifier 143 included in the later-described integrating circuit 74. In other words, the potential of the voltage Vdd is the same as the potential of the power supply voltage of the operational amplifier 143. Therefore, if the potential of the voltage VDD input to the Q-V conversion circuit 70 is the same as the potential of the power supply voltage of the operational amplifier 143, the power supply circuit 71 need not include the voltage generation circuit 110, and may use the voltage VDD as the voltage Vdd.

The voltage adjusting circuit 120 adjusts the potential of the voltage Vdd based on the voltage control signal SEL input from the storage circuit 73, and outputs the adjusted voltage as a voltage Vcnt to the adjacent conductor 75. That is, the power supply circuit 71 including the voltage adjusting circuit 120 and the adjacent conductor 75 are connected by a propagation path on which the voltage Vcnt propagates, and the potential of the adjacent conductor 75 is controlled by the voltage Vcnt. Here, the power supply circuit 71 that is connected to the adjacent conductor 75 and supplies the voltage Vcnt to the adjacent conductor 75 is an example of a potential controlling voltage signal output circuit, and the voltage Vcnt is an example of a potential controlling voltage signal for controlling the potential of the adjacent conductor 75.

The adjacent conductor 75 is an interconnect that is formed in the analog circuit substrate 7, and is made of a metal material such as aluminum or copper, for example. In other words, the adjacent conductor 75 is a metal interconnect.

Figure 6:
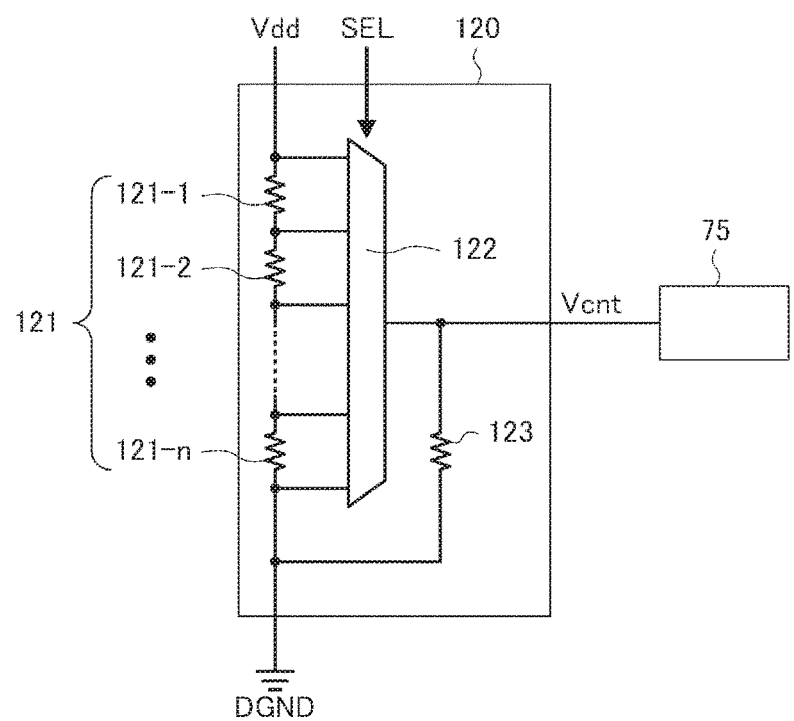
FIG. 6 is a diagram illustrating an exemplary configuration of a voltage adjusting circuit.

Here, an example of the configuration of the voltage adjusting circuit 120 that controls the potential of the adjacent conductor 75 will be described using FIG. 6. FIG. 6 is a diagram illustrating an example of the configuration of the voltage adjusting circuit 120. The voltage adjusting circuit 120 includes n resistors 121, a multiplexer 122, and a resistor 123. The n resistors 121 are connected in series between a propagation path on which the voltage Vdd propagates and a digital ground DGND, which is a ground potential at 0 V. Note that, in the following description, the n resistors 121 connected in series may be respectively referred to as resistors 121-1, 121-2, ..., and 121-n from a high potential side to which the voltage Vdd is supplied. Note that the potential of the digital ground DGND that is a ground potential at 0 V and indicating the reference potential of the Q-V conversion circuit 70 is an example of a ground potential.

Input terminals of the multiplexer 122 are respectively connected to nodes, on a high potential side, of the respective n resistors 121 connected in series and the digital ground DGND. An output terminal of the multiplexer 122 is connected to the adjacent conductor 75. The voltage control signal SEL is input to a control terminal of the multiplexer 122. Also, the multiplexer 122 selects one of the potentials of the nodes, on a high potential side, of the n resistors 121 or the potential of the digital ground DGND based on the voltage control signal SEL, and outputs the selected potential as the voltage Vcnt.

Specifically, if the multiplexer 122 selects, based on the voltage control signal SEL, a connecting point between an $i^{th}$ (i is one of integers from one to n) resistor and an $(i+1)^{th}$ resistor, of the n resistors 121, the multiplexer 122 outputs the voltage Vcnt of a potential obtained by voltage-dividing the potential of the voltage Vdd by a combined resistance of resistors 121-1 to 121-$i$ and a combined resistance of resistors 121-$i$ to 121-$n$. The voltage adjusting circuit 120 configured as described above voltage-divides the voltage Vdd by n resistors 121, and outputs a signal at a potential obtained by voltage-dividing as the voltage Vcnt. That is, the voltage adjusting circuit 120 controls the potential of the voltage Vcnt between the voltage Vdd, which is the potential of the power supply voltage of the integrating circuit 74 and the ground potential based on the voltage control signal SEL. In other words, the potential of the voltage Vcnt is controlled to a potential between the potential of the power supply voltage of the integrating circuit 74 and the potential of the digital ground DGND.

Also, one end of the resistor 123 is connected to the output terminal of the multiplexer 122. The other end of the resistor 123 is connected to the digital ground DGND. This resistor 123 stabilizes the potential of the voltage Vcnt to be supplied to the adjacent conductor 75 that is constituted by a metal interconnect or the like. Here, the resistance value of the resistor 123 is set to a resistance value that is sufficiently larger than the resistance value of the combined resistance of the n resistors 121. Note that a capacitor or the like may be used in place of the resistor 123, or both of the resistor 123 and a circuit element such as a capacitor may be provided. Note that the voltage adjusting circuit 120 need only be configured such that the potential of the voltage Vdd can be adjusted based on the voltage control signal SEL, and the configuration thereof is not limited to the configuration shown in FIG. 6.

Returning to FIG. 5, the integrating circuit 74 includes the operational amplifier 143, a capacitor 144, and a switch 145. One end of the capacitor 144 is connected to an inverting input terminal of the operational amplifier 143, and the other end thereof is connected to an output terminal of the operational amplifier 143. Also, one end of the switch 145 is connected to the inverting input terminal of the operational amplifier 143, and the other end thereof is connected to the output terminal of the operational amplifier 143. That is, the capacitor 144 and the switch 145 are connected in parallel to the operational amplifier 143 between the inverting input terminal of the operational amplifier 143 and the output terminal.

Also, the inverting input terminal of the operational amplifier 143 is connected to an input terminal 141 of the integrating circuit 74. Also, the input terminal 141 of the integrating circuit 74 is connected to an interconnect 76. The charge signal Qin output from the force detection element 5 propagates through the interconnect 76. Therefore, the charge signal Qin is input to the inverting input terminal of the operational amplifier 143 included in the integrating circuit 74 via the input terminal 141 and the interconnect 76. Also, the operational amplifier 143 generates and outputs a voltage signal Vout corresponding to the input charge signal Qin. The voltage signal Vout output from the operational amplifier 143 is output from the integrating circuit 74 through the output terminal 142. A metal material such as aluminum or copper is used as the constituent material of this interconnect 76, for example. In other words, the interconnect 76 is a metal interconnect.

Also, a non-inverting input terminal of the operational amplifier 143 is connected to an analog ground AGND. The analog ground AGND is a reference potential of analog signals in the Q-V conversion circuit 70, and is set to a potential intermediate between the potential of the voltage Vdd and the potential of the digital ground DGND. Also, the operational amplifier 143 converts the charge signal Qin input to the inverting input terminal of the operational amplifier 143 to the voltage signal Vout with the potential of the analog ground AGND input to the non-inverting input terminal being the reference. That is, the potential of the analog ground AGND is an example of a reference potential input to the integrating circuit 74.

The reset signal RST is input to the control terminal of the switch 145. The switch 145 switches the conduction state between one end and the other end between conductive and non-conductive according to the reset signal RST. Also, when the conduction state between the one end and the other end of the switch 145 is controlled to be conductive, various types of errors occurring in the integrating circuit 74 are reset. That is, the switch 145 functions as a reset switch of the integrating circuit 74.

As described above, the Q-V conversion circuit 70 converts the charge signal Qin to the voltage signal Vout using the integrating circuit 74, and outputs the voltage signal Vout. However, in the integrating circuit 74 as shown in FIG. 5, the operation reference point of the operational amplifier 143 shifts, which is caused by the usage environment of the integrating circuit 74, the change in temperature, elapsing of time from when the usage has started or from when manufactured, and the like, and as a result, there are cases where a so-called drift occurs, which is a change in potential of the voltage signal Vout to be output. Such a drift occurring in the operational amplifier 143 is caused by a plurality of factors such as a variation in characteristics of an input stage transistor included in the operational amplifier 143 constituting the integrating circuit 74, variations in characteristics of constituent components including peripheral circuits of the operational amplifier 143, leak currents occurring in peripheral circuits including the operational amplifier, and temperature characteristics thereof, for example.

Also, if a drift occurs in the integrating circuit 74 included in the Q-V conversion circuit 70, the output of the integrating circuit 74 may increase or decrease over time, and there is a risk that the output of the integrating circuit 74 saturates when a certain period of time has elapsed. When the output of the integrating circuit 74 saturates, even if the charge signal Qin is input to the integrating circuit 74, the charge signal Qin is not reflected on the voltage signal Vout to be output from the integrating circuit 74. That is, when the output of the integrating circuit 74 saturates, the integrating circuit 74 does not function as the integrating circuit 74, and as a result, the Q-V conversion circuit 70 no longer functions properly.

Such a drift can be temporarily resolved by resetting various errors occurring in the integrating circuit 74 by the switch 145 described above. However, the operations of the Q-V conversion circuit 70 and the force sensor 1 including the Q-V conversion circuit 70 need to be stopped in order to control the conduction state between one end and the other end of the switch 145 to be conductive, and therefore there is a risk that, when such a force sensor 1 is used in a device that needs to operate continuously, the convenience of the device is largely lost.

With respect to such a drift, in the Q-V conversion circuit 70 in the present embodiment, the adjacent conductor 75 is provided along the interconnect 76 through which the charge signal Qin propagates, and the potential of the adjacent conductor 75 is controlled, and with this, the influence of a drift in the Q-V conversion circuit 70 is reduced, and the risk that the integrating circuit 74 and the Q-V conversion circuit 70 will not function properly is reduced.

Figure 7A:
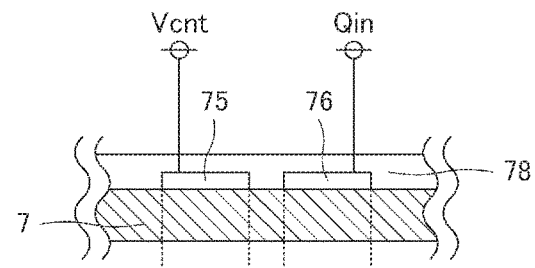
FIGS. 7A and 7B are schematic diagrams illustrating the positional relationship between an interconnect included in the Q-V conversion circuit and an adjacent conductor.
Figure 7B:
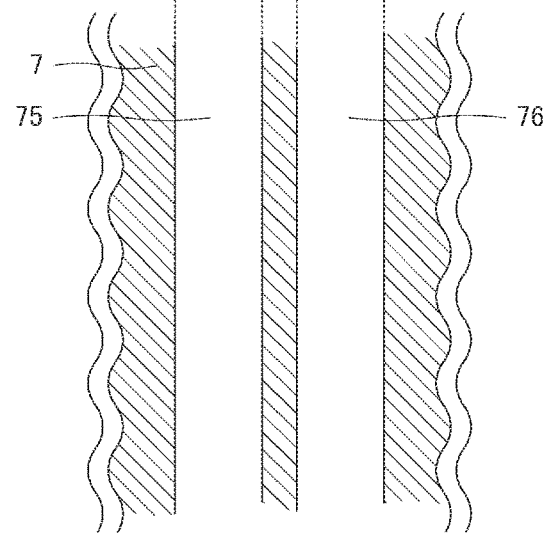

The operations for reducing the influence of a drift on the Q-V conversion circuit 70 will be described using the drawings. FIGS. 7A and 7B are schematic diagrams illustrating the positional relationship between the interconnect 76 and the adjacent conductor 75 that are included in the Q-V conversion circuit 70. FIG. 7A is a cross-sectional view illustrating the positional relationship between the interconnect 76 and the adjacent conductor 75, and FIG. 7B is a plan view illustrating the positional relationship between the interconnect 76 and the adjacent conductor 75. Note that illustration of the insulating member 78 shown in FIG. 7A is omitted in FIG. 7B. As shown in FIGS. 7A and 7B, the Q-V conversion circuit 70 in the present embodiment includes the adjacent conductor 75 that is provided along at least a portion of the interconnect 76 through which the charge signal Qin propagates, and as a result, the influence of a drift on the Q-V conversion circuit 70 is reduced.

Specifically, as shown in FIG. 7A, the interconnect 76 and the adjacent conductor 75 are formed on the analog circuit substrate 7. Also, the insulating member 78 is provided between the interconnect 76 and the adjacent conductor 75 and on the interconnect 76 and the adjacent conductor 75. Such an adjacent conductor 75 is provided along at least a portion of the interconnect 76, as shown in FIG. 7B.

Here, the adjacent conductor 75 being provided along at least a portion of the interconnect 76 is not limited to a case where the adjacent conductor 75 and the interconnect 76 are provided in parallel in the analog circuit substrate 7, and it is sufficient that a portion is present at which only the insulating member 78 is interposed between the adjacent conductor 75 and the interconnect 76, in at least a portion of the interconnect 76. Note that the distance between the adjacent conductor 75 and the interconnect 76 in this case is preferably a shortest distance in the Q-V conversion circuit 70 that is specified by the design rule. Also, silicon dioxide ($SiO_2$) is used as a constituent material of the insulating member 78, for example. In other words, the insulating member 78 contains silicon oxide.

As a result of the adjacent conductor 75 being provided along at least a portion of the interconnect 76 in the Q-V conversion circuit 70, as described above, when a potential difference occurs between the adjacent conductor 75 and the interconnect 76, a minute current of several femto amperes flows between the adjacent conductor 75 and the interconnect 76 in accordance with the potential difference and the resistivity of the insulating member 78. Specifically, when the potential of the adjacent conductor 75 is higher than the potential of the interconnect 76, a minute current flows from the adjacent conductor 75 to the interconnect 76, and when the potential of the adjacent conductor 75 is lower than the potential of the interconnect 76, a minute current flows from the interconnect 76 to the adjacent conductor 75.

Figure 8:
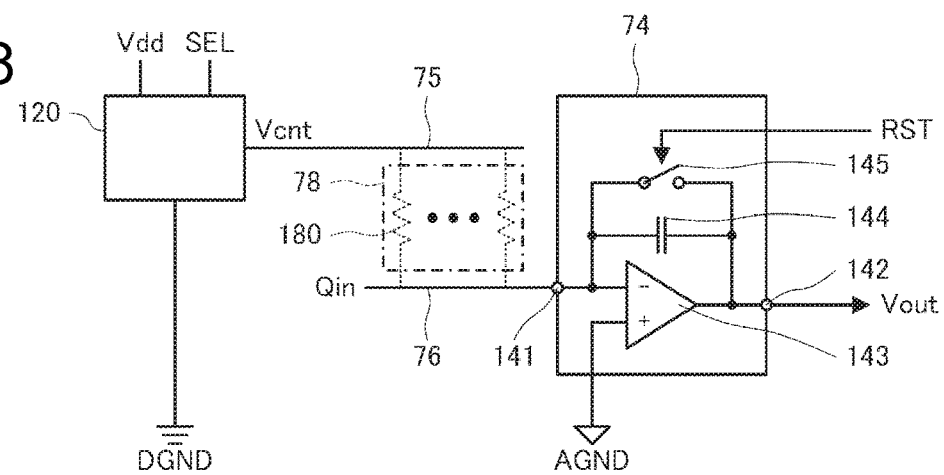
FIG. 8 is a diagram illustrating the reduction of influence of a drift in the Q-V conversion circuit.

Next, the relationship between the current flowing between the adjacent conductor 75 and the interconnect 76 described above and the reduction of influence of a drift will be described using FIG. 8. FIG. 8 is a diagram illustrating the reduction of influence of a drift in the Q-V conversion circuit 70. Note that a pseudo-resistor 180 shown in FIG. 8 illustrates the electric resistance, in a pseudo manner, that is generated in accordance with the resistivity of the insulating member 78 located between the adjacent conductor 75 and the interconnect 76, and does not indicate that a resistive element is provided between the adjacent conductor 75 and the interconnect 76.

First, a case where a drift occurs such that the potential of the voltage signal Vout to be output from the integrating circuit 74 included in the Q-V conversion circuit 70 increases will be described.

When a drift occurs such that the potential of the voltage signal Vout increases in the Q-V conversion circuit 70, the voltage adjusting circuit 120 makes adjustment such that the potential of the voltage Vcnt to be output is higher than the potential of the interconnect 76. In other words, the potential of the voltage Vcnt is adjusted such that the potential of the adjacent conductor 75 is higher than the potential of the interconnect 76. In this case, a current flows from the adjacent conductor 75 to the interconnect 76 through the pseudo-resistor 180 due to the potential difference between the potential of the adjacent conductor 75 and the potential of the interconnect 76. Therefore, the charge amount of a signal that propagates through the interconnect 76 increases. As a result, the potential of the inverting input terminal of the operational amplifier 143 increases, and the potential of the voltage signal Vout output from the operational amplifier 143 decreases. In other words, the risk that the potential of the voltage signal Vout output from the integrating circuit 74 increases due to the drift is reduced.

Next, a case will be described where a drift occurs, in the Q-V conversion circuit 70, such that the potential of the voltage signal Vout output from the integrating circuit 74 decreases. When a drift occurs such that the potential of the voltage signal Vout decreases in the Q-V conversion circuit 70, the voltage adjusting circuit 120 makes adjustment such that the potential of the voltage Vcnt to be output is lower than the potential of the interconnect 76. In other words, the potential of the voltage Vcnt is adjusted such that the potential of the adjacent conductor 75 is lower than the potential of the interconnect 76. In this case, a current flows from the interconnect 76 to the adjacent conductor 75 through the pseudo-resistor 180 due to the potential difference between the potential of the adjacent conductor 75 and the potential of the interconnect 76. Therefore, the charge amount of a signal that propagates through the interconnect 76 decreases. As a result, the potential of the inverting input terminal of the operational amplifier 143 decreases, and the potential of the voltage signal Vout output from the operational amplifier 143 increases. In other words, the risk that the potential of the voltage signal Vout output from the integrating circuit 74 decreases due to the drift is reduced.

As described above, the Q-V conversion circuit 70 in the present embodiment adjusts the potential of the adjacent conductor 75 by controlling the potential of the voltage Vcnt to a potential different from the potential of the interconnect 76. Also, as a result of the potential of the interconnect 76 being adjusted based on the potential of the adjacent conductor 75, the voltage signal Vout to be output from the integrating circuit 74 is corrected. With this, the influence of a drift occurring in the integrating circuit 74 is reduced.

Here, the adjacent conductor 75 is an example of a second conductive member, and the interconnect 76 through which the charge signal Qin propagates is an example of a first conductive member. Note that the interconnect 76 that connects the input terminal 141 and the inverting input terminal of the operational amplifier 143 and through which the charge signal Qin propagates is an example of the first conductive member in a narrow sense, but the interconnect that connects the input terminal 141 and the one end of the capacitor 144 and through which the charge signal Qin propagates and the interconnect that connects the input terminal 141 and the one end of the switch 145 and through which the charge signal Qin propagates are also examples of the first conductive member in a broad sense.

Next, one of the roles of the temperature detection circuit 72 described above will be described. One of the factors that causes a drift in the integrating circuit 74 is a change in temperature of various constituent elements including the integrating circuit 74. That is, the width of variation in the potential of the voltage signal Vout caused by a drift occurring in the integrating circuit 74 changes due to the change in temperature. The temperature detection circuit 72 detects temperature of at least one of the analog circuit substrate 7, the Q-V conversion circuit 70, and the force sensor 1 including the Q-V conversion circuit 70, and the potential of the voltage Vcnt to be output from the power supply circuit 71 is controlled based on the temperature detected by the temperature detection circuit 72, and as a result, it is possible to change the potential of the adjacent conductor 75 based on the temperature of the at least one of the analog circuit substrate 7, the Q-V conversion circuit 70, and the force sensor 1 including the Q-V conversion circuit 70. The Q-V conversion circuit 70 includes the temperature detection circuit 72, and the temperature information detected by the temperature detection circuit 72 is taken into consideration, and as a result, the risk that the potential of the voltage signal Vout changes due to a drift occurring in the integrating circuit 74 can further be reduced.

Effects

As described above, the Q-V conversion circuit 70 in the present embodiment includes the interconnect 76 through which the charge signal Qin input to the integrating circuit 74 propagates, and the adjacent conductor 75 that is provided along at least a portion of the interconnect 76. Also, the potential of the adjacent conductor 75 is adjusted by the voltage Vcnt that is output from the power supply circuit 71. With this, a current caused by the potential difference between the potential of the adjacent conductor 75 and the potential of the interconnect 76 flows through the insulating member 78, and as a result, the potential of the input terminal 141 of the integrating circuit 74 can be adjusted. With this, the output of the integrating circuit 74 can be adjusted, and the influence of a drift that the output of the integrating circuit 74 changes over time can be reduced. That is, in the Q-V conversion circuit 70 in the present embodiment, as a result of adjusting the potential of the adjacent conductor 75 that is formed by a metal interconnect or the like whose variation in manufacturing and change in characteristics over time or due to the change in temperature are small, the influence of a drift that the output of the integrating circuit 74 changes over time can be reduced. Therefore, in the Q-V conversion circuit 70 in the present embodiment, the influence of a drift that the output of the integrating circuit 74 changes over time can be reduced while reducing the influence of the variation in manufacturing and the change in characteristics over time or due to the change in temperature.

1.2 Second Embodiment

Figure 9:
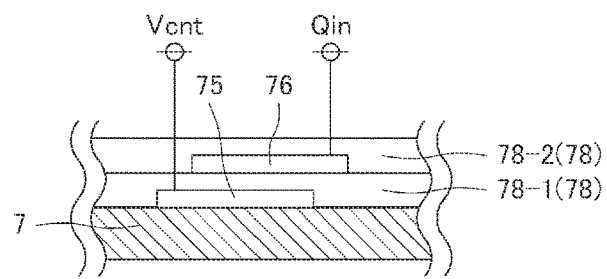
FIG. 9 is a schematic diagram illustrating the positional relationship between an interconnect and an adjacent conductor in a force sensor in a second embodiment.

Next, a Q-V conversion circuit 70 in a second embodiment will be described using FIG. 9. As shown in FIG. 9, in a force sensor 1 in the second embodiment, the arrangement of the interconnect 76 included in the Q-V conversion circuit 70 and the adjacent conductor 75 differs from that in the force sensor 1 in the first embodiment. Note that in the description of the force sensor 1 of the second embodiment, the constituent elements that are the same as those in the first embodiment are given the same reference signs, and the description thereof will be omitted or simplified.

FIG. 9 is a schematic diagram illustrating the positional relationship between the interconnect 76 and the adjacent conductor 75 in the Q-V conversion circuit 70, in the force sensor 1 in the second embodiment. As shown in FIG. 9, in the Q-V conversion circuit 70 in the second embodiment, the interconnect 76, the adjacent conductor 75, and the insulating member 78 are stacked on the analog circuit substrate 7 in the order of adjacent conductor 75, the insulating member 78, and the interconnect 76.

Specifically, the adjacent conductor 75 is provided on the analog circuit substrate 7. Also, the interconnect 76 is provided above the adjacent conductor 75 via an insulating member 78-1. Also, an insulating member 78-2 is provided on the interconnect 76. Here, the insulating member 78-1 and the insulating member 78-2 correspond to the insulating member 78 in the first embodiment.

A voltage Vcnt for reducing the influence of a drift occurring in the integrating circuit 74 is supplied to the adjacent conductor 75 included in the Q-V conversion circuit 70 configured as described above, similarly to the first embodiment. Also, when the potential of the voltage Vcnt supplied to the adjacent conductor 75 is higher than the potential of the interconnect 76, a current flows from the adjacent conductor 75 to the interconnect 76 through the insulating member 78-1, and when the potential of the voltage Vcnt supplied to the adjacent conductor 75 is lower than the potential of the interconnect 76, a current flows from the interconnect 76 toward the adjacent conductor 75 through the insulating member 78-1. With this, similarly to the first embodiment, the amount of charges that propagate through the interconnect 76 is adjusted, and as a result, the potential of the inverting input terminal of the operational amplifier 143 is adjusted. Therefore, the voltage signal Vout to be output from the integrating circuit 74 is corrected.

As described above, even in the Q-V conversion circuit 70 in which the interconnect 76, the adjacent conductor 75, and the insulating member 78 are stacked in the order of the adjacent conductor 75, the insulating member 78, and the interconnect 76, as a result of adjusting the potential of the voltage Vcnt to be supplied to the adjacent conductor 75, the influence of a drift that the output of the integrating circuit 74 changes over time can be reduced, and the effects similar to those of the Q-V conversion circuit 70 in the first embodiment can be obtained.

1.3 Third Embodiment

Figure 10:
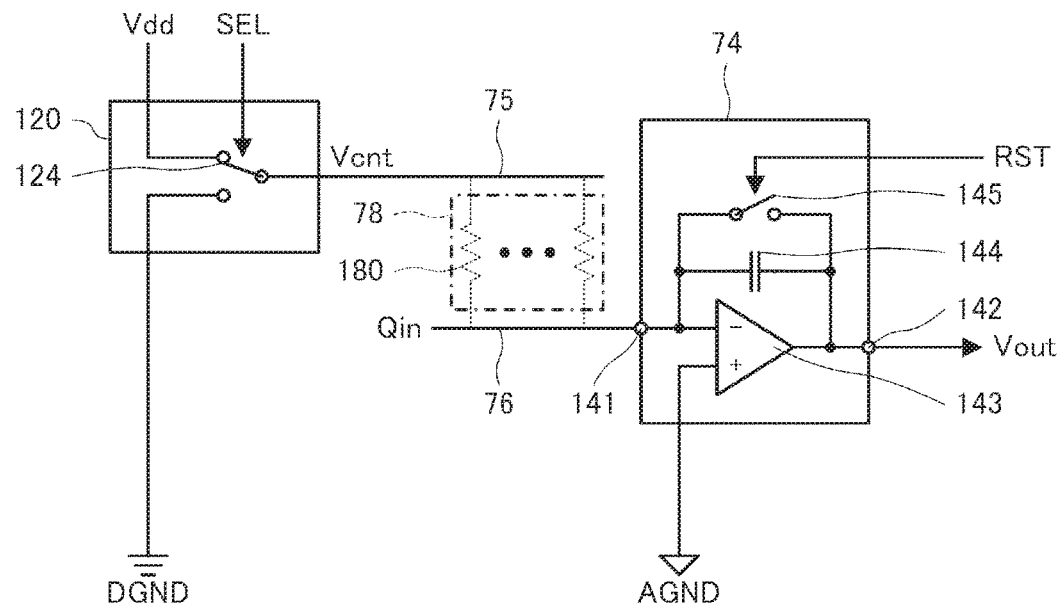
FIG. 10 is a diagram illustrating a configuration of a voltage adjusting circuit in a force sensor in a third embodiment.

Next, a Q-V conversion circuit 70 in a third embodiment will be described using FIG. 10. As shown in FIG. 10, in a force sensor 1 in the third embodiment, the configuration of the voltage adjusting circuit 120 differs from that in the force sensor 1 in the first embodiment. Note that in the description of the force sensor 1 of the third embodiment, the constituent elements that are the same as those in the first and second embodiments are given the same reference signs, and the description thereof will be omitted or simplified.

FIG. 10 is a diagram illustrating the configuration of the voltage adjusting circuit 120 included in the Q-V conversion circuit 70 in the force sensor 1 in the third embodiment. As shown in FIG. 10, the voltage adjusting circuit 120 in the third embodiment includes a switch 124. The switch 124 switches the potential of the voltage Vcnt between the potential of the voltage Vdd and the potential of the digital ground DGND based on the voltage control signal SEL. In other words, the potential of the voltage Vcnt in the third embodiment is switched between the potential of the voltage Vdd, which is a potential of the power supply voltage of the integrating circuit, and the potential of the digital ground DGND, which is a ground potential.

The potential of the interconnect 76 when the charge signal Qin is not supplied to the operational amplifier 143 is the same as the potential of the analog ground AGND connected to the non-inverting input terminal of the operational amplifier 143 due to the imaginary short circuit of the operational amplifier 143. Also, as described above, the potential of the analog ground AGND is set to an intermediate potential between the potential of the voltage Vdd and the potential of the digital ground DGND. Therefore, when the switch 124 supplies the potential of the voltage Vdd to the adjacent conductor 75 as the voltage Vcnt, the potential of the adjacent conductor 75 is higher than the potential of the interconnect 76. As a result, a current flows from the adjacent conductor 75 to the interconnect 76 through the insulating member 78. On the other hand, when the switch 124 supplies the potential of the digital ground DGND to the adjacent conductor 75 as the voltage Vcnt, the potential of the adjacent conductor 75 is lower than the potential of the interconnect 76. As a result, a current flows from the interconnect 76 to the adjacent conductor 75 through the insulating member 78.

That is, as a result of switching, by the switch 124, the potential that is supplied to the adjacent conductor 75 as the voltage Vcnt between the potential of the voltage Vdd and the potential of the digital ground DGND, the amount of charges that propagate through the interconnect 76 is adjusted, similarly to the first embodiment. As a result, the potential of the inverting input terminal of the operational amplifier 143 is adjusted, and the voltage signal Vout to be output from the integrating circuit 74 is corrected.

As described above, even in a configuration in which the potential of the voltage Vcnt supplied from the power supply circuit 71 is switched between the potential of the voltage Vdd and the potential of the digital ground DGND by the switch 124, the influence of a drift that the output of the integrating circuit 74 changes over time can be reduced. Therefore, the effects similar to those of the Q-V conversion circuit 70 in the first embodiment can be obtained. Moreover, in the Q-V conversion circuit 70 in the third embodiment, the configuration of the power supply circuit 71 can be simplified relative to the Q-V conversion circuit 70 in the first embodiment, and the size of the Q-V conversion circuit 70 can be reduced.

1.4 Fourth Embodiment

Figure 11:
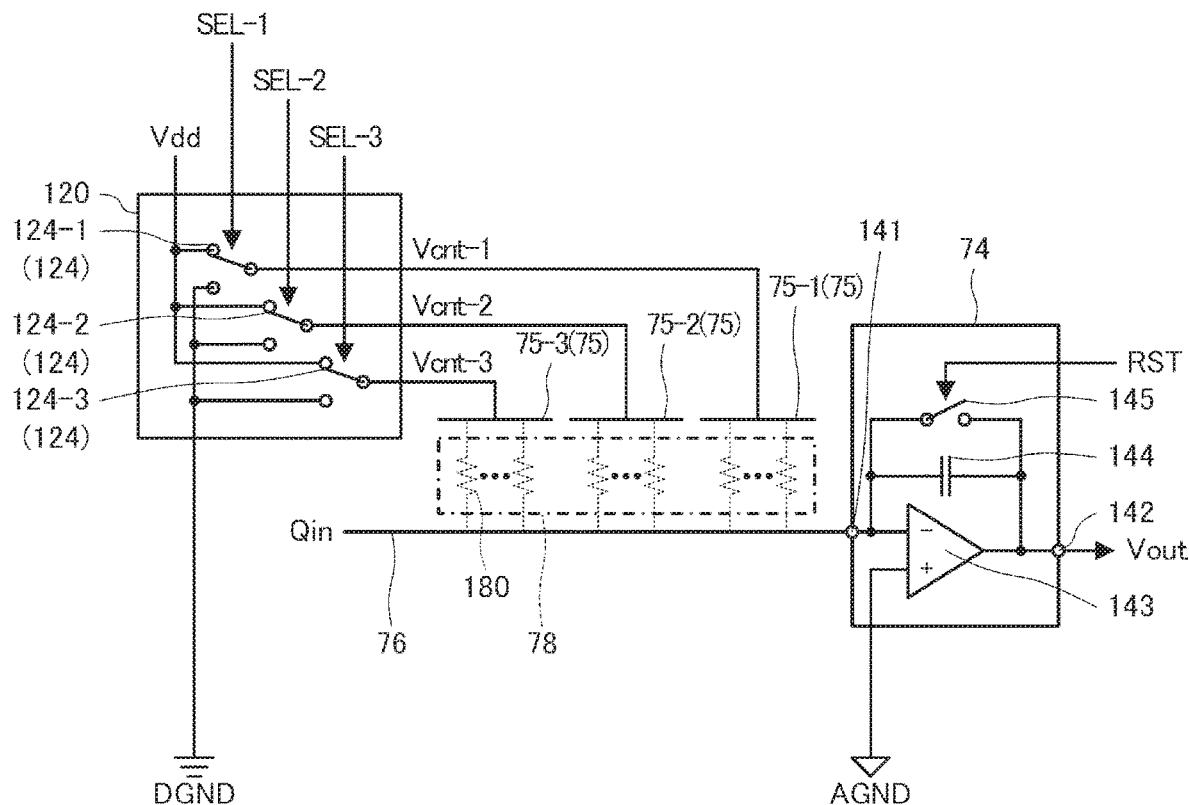
FIG. 11 is a diagram illustrating a configuration of a voltage adjusting circuit in a force sensor in a fourth embodiment.
Figure 12A:
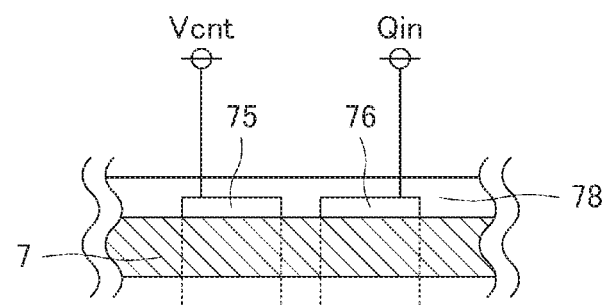
FIGS. 12A and 12B are schematic diagrams illustrating the positional relationship between an interconnect and a plurality of adjacent conductors in the force sensor in the fourth embodiment.
Figure 12B:
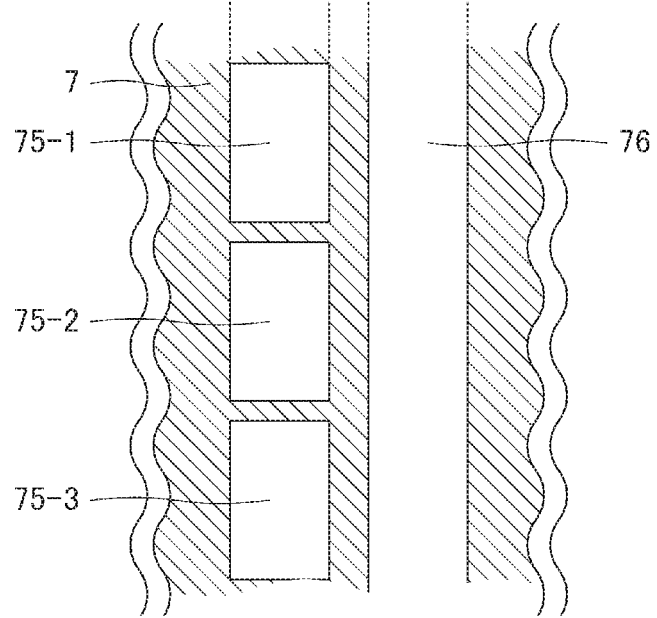

Next, a Q-V conversion circuit 70 in a fourth embodiment will be described using FIGS. 11, 12A, and 12B. As shown in FIGS. 11, 12A, and 12B, the force sensor 1 in the fourth embodiment differs from the force sensor 1 in the third embodiment in that the voltage adjusting circuit 120 includes a plurality of switches 124, and the Q-V conversion circuit 70 includes a plurality of adjacent conductors 75 respectively associated with the plurality of switches 124. Note that in the description of the force sensor 1 of the fourth embodiment, the constituent elements that are the same as those in the first to third embodiments are given the same reference signs, and the description thereof will be omitted or simplified.

FIG. 11 is a diagram illustrating the configuration of the voltage adjusting circuit 120 included in the Q-V conversion circuit 70 in the force sensor 1 in the fourth embodiment. Also, FIGS. 12A and 12B are schematic diagrams illustrating the positional relationship between the interconnect 76 and a plurality of adjacent conductors 75 that are included in the Q-V conversion circuit 70 in the force sensor 1 in the fourth embodiment.

As shown in FIG. 11, the voltage adjusting circuit 120 in the fourth embodiment includes the three switches 124-1 to 124-3. The switch 124-1 switches the potential of a voltage Vcnt-1 to be supplied to an adjacent conductor 75-1 between the potential of the voltage Vdd and the potential of the digital ground DGND based on a voltage control signal SEL-1. Similarly, the switch 124-2 switches the potential of a voltage Vcnt-2 to be supplied to an adjacent conductor 75-2 between the potential of the voltage Vdd and the potential of the digital ground DGND based on a voltage control signal SEL-2, and the switch 124-3 switches the potential of a voltage Vcnt-3 to be supplied to an adjacent conductor 75-3 between the potential of the voltage Vdd and the potential of the digital ground DGND based on a voltage control signal SEL-3. Here, one of the adjacent conductors 75-1, 75-2, and 75-3 is an example of the second conductive member in the fourth embodiment, and one of the voltages Vcnt-1, Vcnt-2, and Vcnt-3 to be supplied to one of the adjacent conductors 75-1, 75-2, and 75-3 corresponding to the second conductive member in the fourth embodiment is an example of a first potential controlling voltage signal. Also, one of the adjacent conductors 75-1, 75-2, and 75-3 that is not corresponding to the second conductive member is an example of a third conductive member, and one of the voltages Vcnt-1, Vcnt-2, and Vcnt-3 to be supplied to one of the adjacent conductors 75-1, 75-2, and 75-3 corresponding to the third conductive member is an example of a second potential controlling voltage signal.

Next, the positional relationship between the adjacent conductors 75-1 to 75-3 and the interconnect 76 will be described using FIGS. 12A and 12B. FIGS. 12A and 12B are schematic diagrams illustrating the positional relationship between the interconnect 76 and the adjacent conductors 75-1 to 75-3 that are included in the Q-V conversion circuit 70 in the force sensor 1 in the fourth embodiment. Also, FIG. 12A is a cross-sectional view illustrating the positional relationship between the interconnect 76 and the adjacent conductor 75, and FIG. 12B is a plan view illustrating the positional relationship between the interconnect 76 and the adjacent conductor 75. Note that, in FIG. 12A, the adjacent conductors 75-1 to 75-3 are not distinguished therebetween, and are simply illustrated as the adjacent conductor 75, and the voltages Vcnt-1 to Vcnt-3 are not distinguished therebetween, and are simply illustrated as the voltage Vcnt. Also, in FIG. 12B, the insulating member 78 shown in FIG. 12A is not illustrated.

As shown in FIGS. 12A and 12B, the Q-V conversion circuit 70 in the fourth embodiment includes the adjacent conductors 75-1 to 75-3 as the plurality of adjacent conductors 75, and each of the adjacent conductors 75-1 to 75-3 are provided along the interconnect 76.

Specifically, as shown in FIG. 12A, the interconnect 76 and the adjacent conductors 75-1 to 75-3 are formed on the analog circuit substrate 7. Also, the insulating member 78 is provided between the interconnect 76 and the adjacent conductors 75-1 to 75-3 and on the interconnect 76 and the adjacent conductors 75. Also, as shown in FIG. 12B, the adjacent conductors 75-1 to 75-3 are each provided along at least a portion of the interconnect 76.

In the Q-V conversion circuit 70 configured as described above, when the switch 124-1 supplies the potential of the voltage Vdd to the adjacent conductor 75-1 as the voltage Vcnt-1, the potential of the adjacent conductor 75-1 is higher than the potential of the interconnect 76. As a result, a current flows from the adjacent conductor 75-1 to the interconnect 76 through the insulating member 78. On the other hand, when the switch 124-1 supplies the potential of the digital ground DGND to the adjacent conductor 75-1 as the voltage Vcnt-1, the potential of the adjacent conductor 75-1 is lower than the potential of the interconnect 76. As a result, a current flows from the interconnect 76 to the adjacent conductor 75-1 through the insulating member 78.

Similarly, when the switches 124-2 and 124-3 respectively supply the potential of the voltage Vdd to the adjacent conductors 75-2 and 75-3 as the voltages Vcnt-2 and Vcnt-3, the potentials of the adjacent conductors 75-2 and 75-3 are higher than the potential of the interconnect 76. As a result, currents flow from the adjacent conductors 75-2 and 75-3 to the interconnect 76 through the insulating member 78. On the other hand, when the switches 124-2 and 124-3 respectively supply the potential of the digital ground DGND to the adjacent conductors 75-2 and 75-3 as the voltages Vcnt-2 and Vcnt-3, the potentials of the adjacent conductors 75-2 and 75-3 are lower than the potential of the interconnect 76. As a result, currents flow from the interconnect 76 to the adjacent conductors 75-2 and 75-3 through the insulating member 78.

Here, the switches 124-1 to 124-3 are respectively controlled by the voltage control signals SEL-1 to SEL-3. For example, when the switch 124-1 supplies the potential of the voltage Vdd to the adjacent conductor 75-1 as the voltage Vcnt-1 based on the voltage control signal SEL-1, the switch 124-2 supplies the potential of the voltage Vdd to the adjacent conductor 75-2 as the voltage Vcnt-2 based on the voltage control signal SEL-2, and the switch 124-3 supplies the potential of the digital ground DGND to the adjacent conductor 75-3 as the voltage Vcnt-3 based on the voltage control signal SEL-3, currents in accordance with the potential differences between the potentials of the adjacent conductors 75-1 and 75-2 and the potential of the interconnect 76 and the resistivity of the insulating member 78 are supplied from the adjacent conductors 75-1 and 75-2 to the interconnect 76, and a current in accordance with the potential difference between the potential of the adjacent conductor 75-3 and the potential of the interconnect 76 and the resistivity of the insulating member 78 is supplied to the adjacent conductor 75-3 from the interconnect 76. Therefore, charges based on the difference between the currents that are supplied from the adjacent conductors 75-1 and 75-2 to the interconnect 76 and the current that is supplied from the interconnect 76 to the adjacent conductor 75-3 are supplied to the interconnect 76.

That is, the amount of charges to be supplied to the interconnect 76 can be finely controlled relative to the third embodiment by controlling each of the switches 124-1 to 124-3. As a result, the potential of the inverting input terminal of the operational amplifier 143 can be finely adjusted, and the voltage signal Vout to be output from the integrating circuit 74 can be finely corrected. Accordingly, with the Q-V conversion circuit 70 in the fourth embodiment, the size of the Q-V conversion circuit 70 can be reduced, similarly to the third embodiment, and the correction accuracy of the voltage signal Vout to be output from the integrating circuit 74 can be improved relative to the Q-V conversion circuit 70 in the third embodiment.

1.5 Fifth Embodiment

Figure 13A:
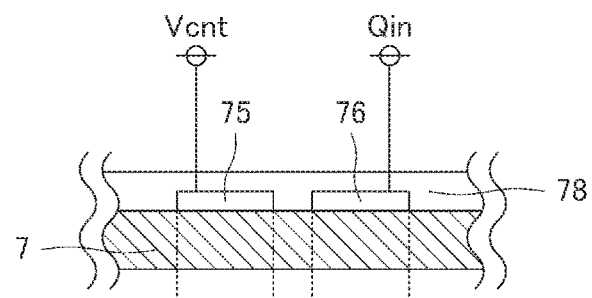
FIGS. 13A and 13B are schematic diagrams illustrating the positional relationship between an interconnect and an adjacent conductor in a force sensor in a fifth embodiment.
Figure 13B:
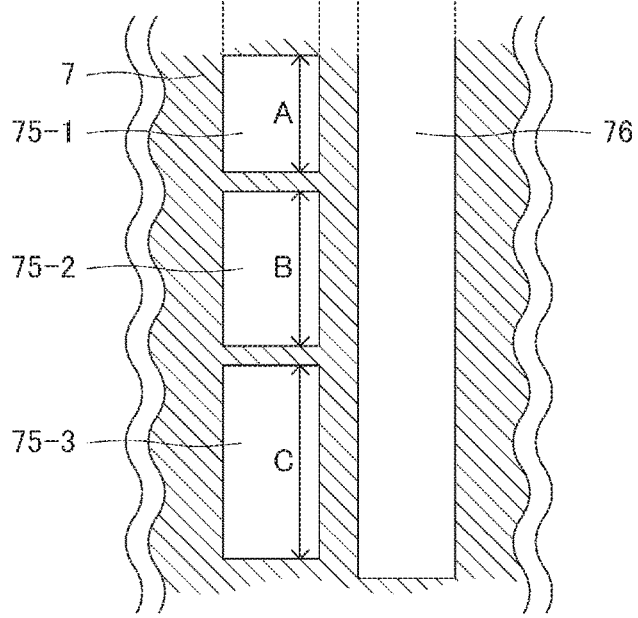

Next, a Q-V conversion circuit 70 in a fifth embodiment will be described using FIGS. 13A and 13B. As shown in FIGS. 13A and 13B, the force sensor 1 in the fifth embodiment differs from the force sensor 1 in the fourth embodiment in that the length of an adjacent conductor 75-1 provided along the interconnect 76, the length of an adjacent conductor 75-2 provided along the interconnect 76, and the length of an adjacent conductor 75-3 provided along the interconnect 76 are different to each other. Note that in the description of the force sensor 1 of the fifth embodiment, the constituent elements that are the same as those in the first to fourth embodiments are given the same reference signs, and the description thereof will be omitted or simplified.

FIGS. 13A and 13B are schematic diagrams illustrating the positional relationship between the interconnect 76 and the adjacent conductors 75-1 to 75-3 that are included in the Q-V conversion circuit 70 in the force sensor 1 in the fifth embodiment. Also, FIG. 13A is a cross-sectional view illustrating the positional relationship between the interconnect 76 and the adjacent conductor 75, and FIG. 13B is a plan view illustrating the positional relationship between the interconnect 76 and the adjacent conductor 75. Note that, in FIG. 13A, the adjacent conductors 75-1 to 75-3 are not distinguished therebetween, and are simply illustrated as the adjacent conductor 75, and voltages Vcnt-1 to Vcnt-3 are not distinguished therebetween, and are simply illustrated as the voltage Vcnt. Also, in FIG. 13B, the insulating member 78 shown in FIG. 13A is not illustrated.

As shown in FIG. 13A, the interconnect 76 and the adjacent conductors 75-1 to 75-3 are formed on the analog circuit substrate 7, similarly to the fourth embodiment. Also, the insulating member 78 is provided between the interconnect 76 and the adjacent conductors 75-1 to 75-3 and on the interconnect 76 and the adjacent conductors 75. Also, as shown in FIG. 13B, the adjacent conductors 75-1 to 75-3 are each provided along at least a portion of the interconnect 76. Specifically, the adjacent conductor 75-1 is provided parallel to the interconnect 76 in a section having a length A, the adjacent conductor 75-2 is provided parallel to the interconnect 76 in a section having a length B, and the adjacent conductor 75-3 is provided parallel to the interconnect 76 in a section having a length C.

In the Q-V conversion circuit 70, if the distances between the respective adjacent conductors 75-1 to 75-3 and the interconnect 76 are the same, the respective resistance values between the adjacent conductors 75-1 to 75-3 and the interconnect 76 decrease and the currents flowing between the respective adjacent conductors 75-1 to 75-3 and the interconnect 76 increase, in the ascending order of the lengths of the adjacent conductors 75-1 to 75-3 provided along the interconnect 76. That is, if the length A, the length B, and the length C are in a relationship of "length A<length B<length C", as shown in FIG. 13B, the current flowing between the adjacent conductor 75-1 and the interconnect 76 is smaller than the current flowing between the adjacent conductor 75-2 and the interconnect 76, and the current flowing between the adjacent conductor 75-2 and the interconnect 76 is smaller than the current flowing between the adjacent conductor 75-3 and the interconnect 76.

As described above, in the Q-V conversion circuit 70 in the fifth embodiment, the length of the adjacent conductor 75-1 provided along the interconnect 76, the length of the adjacent conductor 75-2 provided along the interconnect 76, and the length of the adjacent conductor 75-3 provided along the interconnect 76 are different to each other, and as a result, the amount of current flowing between the adjacent conductor 75-1 and the interconnect 76, the amount of current flowing between the adjacent conductor 75-2 and the interconnect 76, and the amount of current flowing between the adjacent conductor 75-3 and the interconnect 76 can be made different to each other. Also, in the Q-V conversion circuit 70 in the fifth embodiment, as a result of separately controlling the switches 124-1 to 124-3 by the respective voltage control signals SEL-1 to SEL-3, the amount of charges that propagate through the interconnect 76 can be finely adjusted relative to the Q-V conversion circuit 70 in the fourth embodiment. Accordingly, with the Q-V conversion circuit 70 in the fifth embodiment, the correction accuracy of the voltage signal Vout to be output from the integrating circuit 74 can further be improved relative to the Q-V conversion circuit 70 in the fourth embodiment.

Here, one of the adjacent conductors 75-1, 75-2, and 75-3 is an example of the second conductive member in the fifth embodiment, and one of the voltages Vcnt-1, Vcnt-2, and Vcnt-3 to be supplied to one of the adjacent conductors 75-1, 75-2, and 75-3 corresponding to the second conductive member in the fifth embodiment is an example of the first potential controlling voltage signal in the fifth embodiment. Also, one of the adjacent conductors 75-1, 75-2, and 75-3 that is not corresponding to the second conductive member is an example of the third conductive member in the fifth embodiment, and one of the voltages Vcnt-1, Vcnt-2, and Vcnt-3 to be supplied to one of the adjacent conductors 75-1, 75-2, and 75-3 corresponding to the third conductive member in the fifth embodiment is an example of the second potential controlling voltage signal in the fifth embodiment.

1.6 Sixth Embodiment

Figure 14:
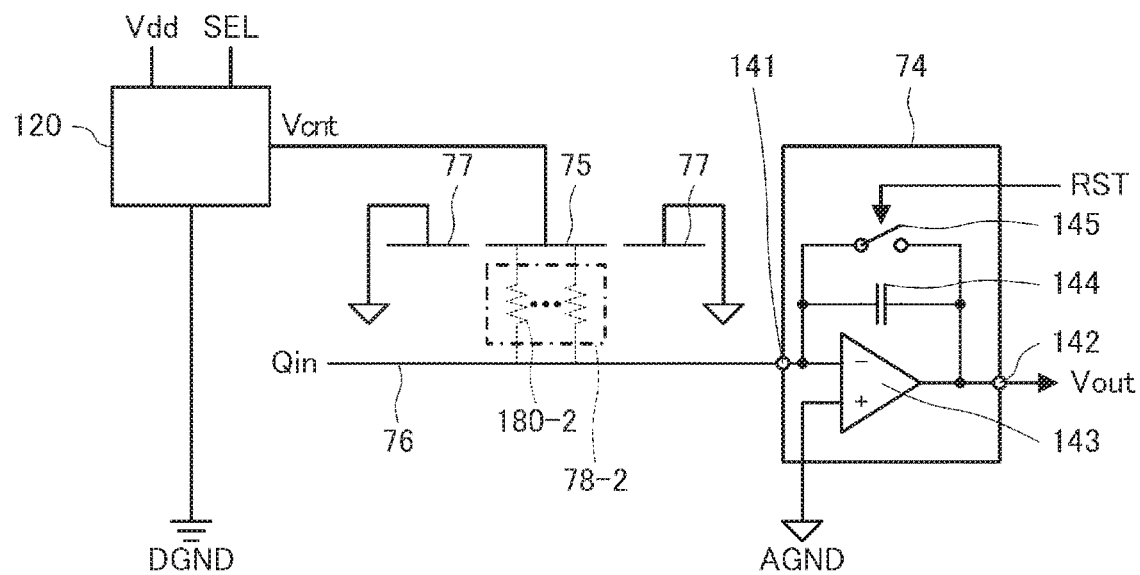
FIG. 14 is a diagram illustrating a configuration of a Q-V conversion circuit 70 in a sixth embodiment.
Figure 15:
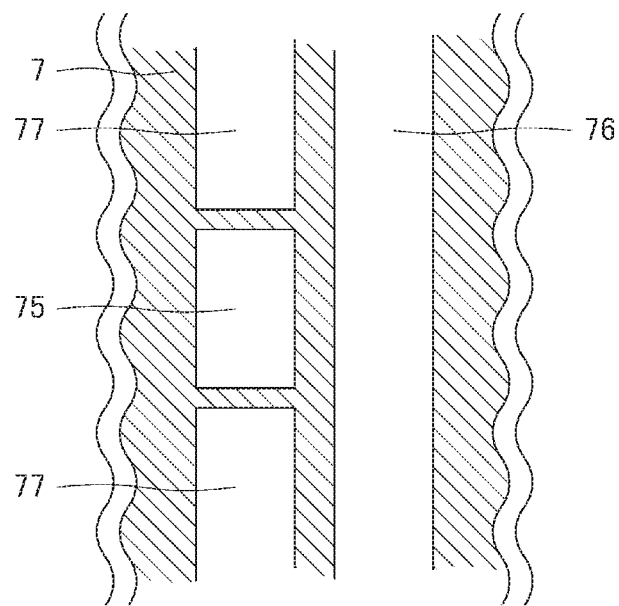
FIG. 15 is a plan view schematically illustrating the positional relationship between an interconnect, an adjacent conductor, and a shield interconnect in a force sensor in the sixth embodiment.

Next, a Q-V conversion circuit 70 in a sixth embodiment will be described using FIGS. 14 and 15. As shown in FIGS. 14 and 15, the force sensor 1 in the sixth embodiment differs from the first to fifth embodiments in that the force sensor 1 includes shield interconnects 77. Note that, in the description of the force sensor 1 of the sixth embodiment, the constituent elements that are the same as those in the first to fifth embodiments are given the same reference signs, and the description thereof will be omitted or simplified.

FIG. 14 is a diagram illustrating the configuration of a Q-V conversion circuit 70 in the sixth embodiment. FIG. 15 is a plan view schematically illustrating the positional relationship between the interconnect 76, the adjacent conductor 75, and the shield interconnects 77 that are included in the Q-V conversion circuit 70, in the force sensor 1 in the sixth embodiment.

As shown in FIGS. 14 and 15, the Q-V conversion circuit 70 in the sixth embodiment includes the shield interconnects 77 provided along at least a portion of the interconnect 76, and the potential of the analog ground AGND to be input to the integrating circuit 74 is supplied to the shield interconnects 77. Also, an insulating member 78 is provided between the shield interconnects 77 and the interconnect 76.

As described above, when the charge signal Qin is not supplied to the operational amplifier 143, the potential of the interconnect 76 is the same as the potential of the analog ground AGND connected to the non-inverting input terminal of the operational amplifier 143 due to the imaginary short circuit of the operational amplifier 143. Therefore, the potential of the interconnect 76 is the same as the potential of the shield interconnects 77. As a result, a current does not flow between the interconnect 76 and the shield interconnects 77. As a result of providing such shield interconnects 77 along the interconnect 76 at portions where the adjacent conductor 75 is not provided, the risk that a current is supplied to the interconnect 76 through which the charge signal Qin propagates from other constituent elements other than the adjacent conductor 75 can be reduced.

That is, in the Q-V conversion circuit 70 in the sixth embodiment, as a result of the shield interconnects 77 functioning as a shield to the interconnect 76, the risk that an unintended leak current is supplied to the interconnect 76 can be reduced. Therefore, the correction accuracy of the voltage signal Vout to be output from the integrating circuit 74 can further be improved.

1.7 Seventh Embodiment

Next, a Q-V conversion circuit 70 in a seventh embodiment will be described using FIG. 16. The force sensor 1 in the seventh embodiment differs from those in the first to sixth embodiments in that the adjacent conductor 75 is formed using an impurity region (well) that is formed in the analog circuit substrate 7. Note that, in the description of the force sensor 1 of the seventh embodiment, the constituent elements that are the same as those in the first to sixth embodiments are given the same reference signs, and the description thereof will be omitted or simplified.

Figure 16:
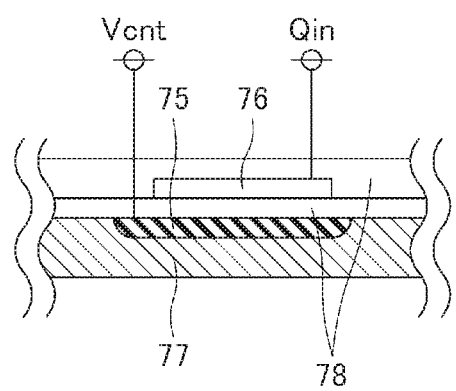
FIG. 16 is a schematic diagram illustrating the positional relationship between an interconnect and an adjacent conductor in a force sensor in a seventh embodiment.

FIG. 16 is a schematic diagram illustrating the positional relationship between the interconnect 76 and the adjacent conductor 75 that are included in the Q-V conversion circuit 70 in the force sensor 1 in the seventh embodiment. As shown in FIG. 16, the adjacent conductor 75 includes an impurity region formed in the analog circuit substrate 7, in the Q-V conversion circuit 70 in the second embodiment.

In this case, the impurity region that functions as the adjacent conductor 75 when the voltage Vcnt is supplied is an impurity region of a conductivity type that is different from that of the analog circuit substrate 7, and the impurity concentration of impurities implanted to the impurity region that functions as the adjacent conductor 75 may be similar to the impurity concentration of other impurity regions formed in the analog circuit substrate 7. Also, the interconnect layer provided in the analog circuit substrate 7 in which the interconnect 76 is provided may be the same as the interconnect layer provided in the analog circuit substrate 7 in which other interconnect patterns are formed. That is, the impurity region that functions as the adjacent conductor 75 when the voltage Vcnt is supplied may be formed in the analog circuit substrate 7 in a process step similar to the process step in which other impurity regions are formed in the analog circuit substrate 7, and the interconnect 76 and other interconnect patterns that are provided in the analog circuit substrate 7 may be formed in the analog circuit substrate 7 in similar process steps.

That is, as shown in the Q-V conversion circuit 70 in the seventh embodiment, by supplying the voltage Vcnt to an impurity region, of the impurity regions formed in the analog circuit substrate 7, that is provided along the interconnect 76, the impurity region may be used as the adjacent conductor 75. Even in such cases, the effects similar to those of the force sensor 1 and the Q-V conversion circuit 70 shown in the first embodiment can be achieved. Moreover, in the Q-V conversion circuit 70 in the seventh embodiment, an interconnect pattern for forming the adjacent conductor 75 need not be provided in the analog circuit substrate 7, and therefore, the size of the Q-V conversion circuit 70 can be reduced.

Note that when an impurity region is caused to function as the adjacent conductor 75 by supplying the voltage Vcnt to the impurity region, the voltage Vcnt may be supplied to the impurity region at a plurality of points, considering the voltage gradient in the impurity region. With this, the influence of the voltage gradient occurring in the impurity region that functions as the adjacent conductor 75 can be reduced.

1.8 Modifications

In the Q-V conversion circuit 70 in the first to seventh embodiments, the power supply circuit 71 may control the timing at which the voltage Vcnt is supplied to the adjacent conductor 75. Specifically, the power supply circuit 71 may stop supplying the voltage Vcnt to the adjacent conductor 75 immediately after various errors occurring in the integrating circuit 74 are reset by the switch 145, and may start supplying the voltage Vcnt to the adjacent conductor 75 after a predetermined period has elapsed after the reset. Also, the power supply circuit 71 may supply the voltage Vcnt that is a pulse signal with a predetermined duty ratio to the adjacent conductor 75.

As described above, as a result of the power supply circuit 71 controlling the timing at which the voltage Vcnt is supplied to the adjacent conductor 75, the risk that migration or the like occurs in the adjacent conductor 75 can be reduced. With this, the influence of the change in characteristics occurring in the adjacent conductor 75 over time or due to the change in temperature can further be reduced.

2. Robot

Next, an example of a robot 1000 that includes the above-described Q-V conversion circuit 70 and force sensor 1 including the Q-V conversion circuit 70 will be described using FIG. 17.

Figure 17:
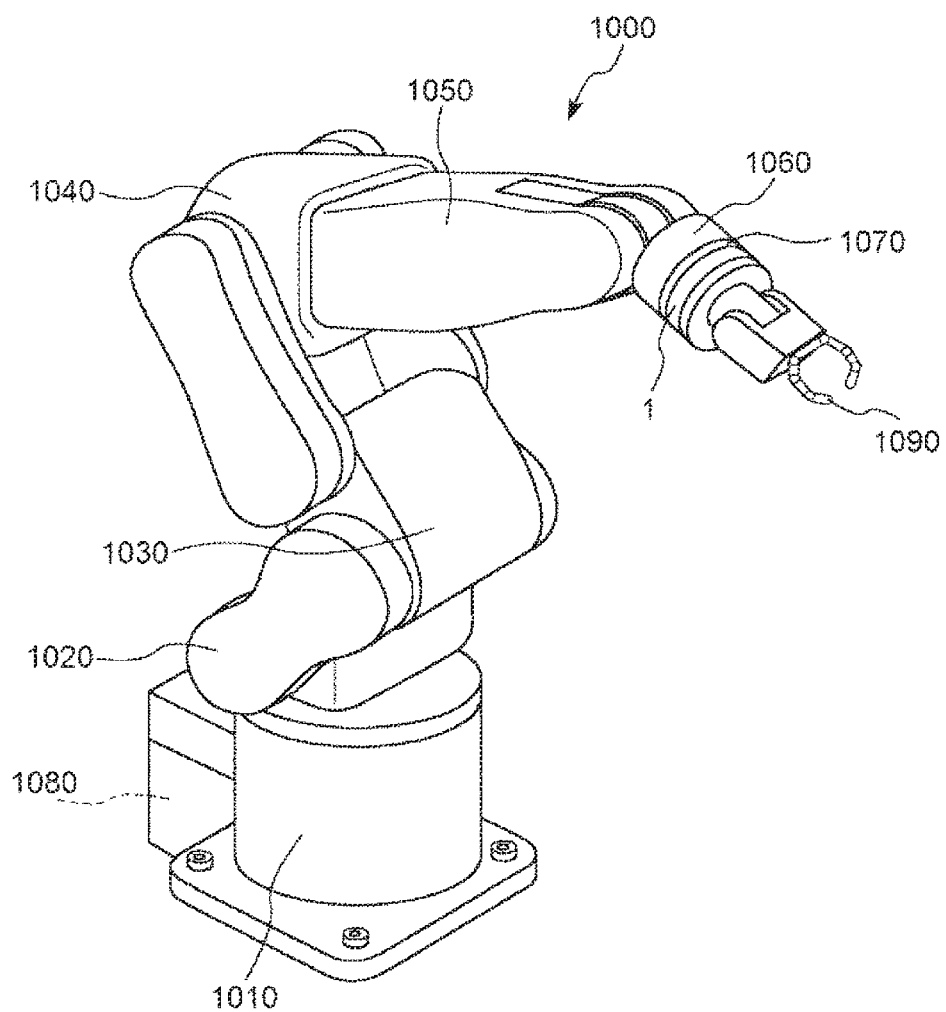
FIG. 17 is a perspective view illustrating an example of a robot.

FIG. 17 is a perspective view illustrating an example of the robot 1000. As shown in FIG. 17, the robot 1000 can perform tasks such as supplying, removing, conveying, and assembling precision instruments and components constituting the precision instruments. The robot 1000 is a six-axis robot, and includes a base 1010 to be fixed to a floor or a ceiling, an arm 1020 rotatably coupled to the base 1010, an arm 1030 rotatably coupled to the arm 1020, an arm 1040 rotatably coupled to the arm 1030, an arm 1050 rotatably coupled to the arm 1040, an arm 1060 rotatably coupled to the arm 1050, an arm 1070 rotatably coupled to the arm 1060, and a controller 1080 for controlling the driving of the arms 1020, 1030, 1040, 1050, 1060, and 1070. Also, the arm 1070 is provided with a hand connection portion, and an end effector 1090 in accordance with the task to be executed by the robot 1000 is attached to the hand connection portion.

In such a robot 1000, the force sensor 1 described above is provided in the vicinity of the end effector 1090 in order to detect the external force applied to the end effector 1090. Also, as a result of feed-backing the force detected by the force sensor 1 to the controller 1080, the robot 1000 can execute more precise tasks. Also, the robot 1000 detects the end effector 1090 coming into contact with an obstacle or the like, based on the force detected by the force sensor 1. With this, the robot 1000 can perform operations for avoiding obstacles, avoiding damaging an object, and the like, and the robot 1000 can execute tasks more safely. Also, in the robot 1000, the force sensors 1 functioning as torque sensors may be arranged at joint portions of the arms 1020, 1030, 1040, 1050, 1060, and 1070.

In the force sensor 1 included in the robot 1000 described above, the influence of a drift that the output of the integrating circuit 74 included in the Q-V conversion circuit 70 changes over time is reduced. Therefore, in the robot 1000, the number of reset operations for reducing the influence of the drift can be reduced. Therefore, the robot 1000 including the force sensor 1 described above can continuously operate over a long period of time.

Note that, in FIG. 17, the robot 1000 includes five arms, but the number of arms included in the robot 1000 is not limited thereto, and may be one to four, or six or more.

As described above, the embodiments and the modifications have been described, but the present invention is not limited to these embodiments, and can be implemented in various modes without departing the scope of the invention. For example, the above-embodiments can be appropriately combined.

The invention includes substantially the same configurations (configurations with the same functions, methods, and results, or configurations with the same objects and effects, for example) as the configurations described in the embodiments. The invention includes configurations in which an unessential part of the configurations described in the embodiments is replaced. The invention also includes configurations that achieve the same effects as those of the configurations described in the embodiments, or configurations that can achieve the same objects as those of the configurations described in the embodiments. The invention also includes configurations obtained by adding a known technique to the configurations described in the embodiments.

What is claimed is:

1. A charge amplifier that converts a charge signal to a voltage signal, comprising:
   a first conductive member through which the charge signal propagates;
   a second conductive member that is provided along at least a portion of the first conductive member;
   an insulating member provided between the first conductive member and the second conductive member;
   a potential controlling voltage signal output circuit that is connected to the second conductive member, and is configured to supply a potential controlling voltage signal to the second conductive member; and
   an integrating circuit that includes an input terminal and an output terminal, the input terminal being connected to the first conductive member, and is configured to output the voltage signal from the output terminal.

2. The charge amplifier according to claim 1, wherein the second conductive member includes a metal interconnect.

3. The charge amplifier according to claim 1, wherein the second conductive member includes an impurity region.

4. The charge amplifier according to claim 1, wherein the insulating member includes a silicon oxide.

5. The charge amplifier according to claim 1, wherein the potential of the potential controlling voltage signal is controlled to be a potential different from a potential of the first conductive member.

6. The charge amplifier according to claim 1, wherein the potential of the potential controlling voltage signal is controlled to be a potential between a potential of a power supply voltage of the integrating circuit and a ground potential.

7. The charge amplifier according to claim 1, further comprising: a temperature detection circuit configured to detect temperature,
   wherein the potential of the potential controlling voltage signal is controlled based on temperature detected by the temperature detection circuit.

8. The charge amplifier according to claim 1, wherein the first conductive member, the second conductive member, and the insulating member are stacked in the order of the second conductive member, the insulating member, and the first conductive member.

9. The charge amplifier according to claim 1, wherein the potential of the potential controlling voltage signal is switched between a potential of a power supply voltage of the integrating circuit and a ground potential.

10. The charge amplifier according to claim 1, further comprising: a third conductive member that is provided along at least a portion of the first conductive member,
    wherein the insulating member is provided between the first conductive member and the third conductive member,
    the third conductive member is connected to the potential controlling voltage signal output circuit, and
    the potential controlling voltage signal output circuit supplies, as the potential controlling voltage signal, a first potential controlling voltage signal to the second conductive member, and a second potential controlling voltage signal to the third conductive member.

11. The charge amplifier according to claim 1, further comprising: a shield interconnect that is provided along at least a portion of the first conductive member,
    wherein a reference potential to be input to the integrating circuit is supplied to the shield interconnect, and
    the insulating member is provided between the shield interconnect and the first conductive member.

12. A force sensor comprising:
    the charge amplifier according to claim 1; and
    a detection element configured to detect an external force and output the charge signal.

13. A robot comprising the charge amplifier according to claim 1.

14. A charge amplifier that converts a charge signal to a voltage signal, comprising:
    a semiconductor substrate;
    a conductive layer above the semiconductor substrate that propagate the charge signal;
    an impurity region that is located in the semiconductor substrate and is located along at least a portion of the conductive layer;
    an insulating layer provided between the conductive layer and the impurity region;

a potential controlling voltage signal output circuit that is connected to the impurity region, and is configured to supply a potential controlling voltage signal to the impurity region; and an integrating circuit that has an input terminal being connected to the conductive layer and an output terminal outputting the voltage signal.

\* \* \* \* \*